US012781018B2

(12) United States Patent
Wu et al.

(10) Patent No.: US 12,781,018 B2
(45) **Date of Patent: *Nov. 3, 2026**

(54) ADDITIVE FOR RECYCLING THERMOSET MATERIALS, RECYCLABLE THERMOSET COMPOSITION AND ITS APPLICATION

(71) Applicant: CHANDA CHEMICAL CORP., Taipei (TW)

(72) Inventors: Chien-Hsin Wu, Taipei (TW); Ying-Chi Huang, Taipei (TW); Ying-Feng Lin, Taipei (TW); Wen-Chang Chen, Taipei (TW); Ho-Ching Huang, Taipei (TW); Ru-Jong Jeng, Taipei (TW)

(73) Assignee: CHANDA CHEMICAL CORP., Taipei (TW)

( * ) Notice: Subject to any disclaimer, the term of this patent is extended or adjusted under 35 U.S.C. 154(b) by 577 days.

This patent is subject to a terminal disclaimer.

(21) Appl. No.: 18/242,320

(22) Filed: Sep. 5, 2023

(65) Prior Publication Data

US 2024/0101784 A1 Mar. 28, 2024

Related U.S. Application Data

(60) Provisional application No. 63/405,939, filed on Sep. 13, 2022.

(51) Int. Cl.

*C08J 11/28* (2006.01)
*C08K 5/205* (2006.01)

(52) U.S. Cl.

CPC ............... *C08J 11/28* (2013.01); *C08K 5/205* (2013.01)

(58) Field of Classification Search

USPC ............................................................ 521/40

See application file for complete search history.

(56) References Cited

U.S. PATENT DOCUMENTS 11,453,743 B2 * 9/2022 Wu .................... C08G 59/4057
2021/0403670 A1 * 12/2021 Xie .......................... C08J 11/16

FOREIGN PATENT DOCUMENTS

CN 115368539 A * 11/2022 ............. C08G 59/26

OTHER PUBLICATIONS

CN-115368539-A Machine Translation (Year: 2022).*

* cited by examiner

*Primary Examiner* — Terressa Boykin
(74) *Attorney, Agent, or Firm* — WPAT, PC

(57) ABSTRACT

A novel additive for recycling thermoset materials, its related recyclable thermoset composition and its application are disclosed. Specifically, the composition of the additive comprises at least one copolymer that has at least one carbamate group, at least one carbonate group and/or at least one urea group, and a number-average molecular weight of the copolymer is between 100 and 50,000 Da.

13 Claims, 22 Drawing Sheets

ADDITIVE FOR RECYCLING THERMOSET MATERIALS, RECYCLABLE THERMOSET COMPOSITION AND ITS APPLICATION

TECHNICAL FIELD

The invention relates to an additive for recycling thermoset materials, a recyclable thermoset composition and its application. Specifically, a composition of the additive comprises a copolymer and a processing aid.

BACKGROUND

Thermoset materials are high molecular weight polymers that are an excellent alternative to thermoplastics, metals and wood, due to their structure, physical properties, cost and workability.

However, thermoset materials are difficult to be recycled because their crosslinked three-dimensional chemical structure cannot be re-melted by heating or using solvent. Hence, recycling thermoset materials is usually an expensive and ineffective process. Traditionally, incineration of thermoset materials offers poor energy efficiency and generates polluting emissions. Mechanical recycling thermoset materials only allows for recovering lower performance reinforcements. As so far, the issue of recycling thermoset materials has been investigated, but it is still a fully unsolved problem such as environmental non-friendly and financially non-economic.

Accordingly, there is a continuing need to develop an efficient solution or process for recycling thermoset materials and to achieve the goals of green chemistry and circular economy.

SUMMARY OF THE INVENTION

In view of the above background of the invention and to meet the requirements of the industry, the invention discloses an additive for recycling thermoset material.

Specifically, a composition of the additive for recycling thermoset material comprises at least one copolymer and/or at least one processing aid.

Generally, the copolymer has at least one carbamate group, at least one carbonate group and/or at least one urea group, and a number-average molecular weight of the copolymer is between 100 and 50,000 Da.

On the other hand, the processing aid comprises amines, catalysts, solvents or their mixture. Preferably, the processing aid is a hydroxy compound, amino compound, amino-hydroxy compound or their mixture.

In one aspect, the catalysts comprise amines, imidazoles, metal and its salts, lewis acids or lewis bases. The amine-type catalyst comprises quaternary ammonium compounds, dimethylamine, diethylamine, triethylamine, triethanolamine, dimethylethanolamine, N,N-dimethylaniline or pyridine. Amidine type catalyst comprises 1,8-Diazabicyclo [5.4.0]undec-7-ene (DBU),1,5-diazabicyclo[4.3.0]non-5-ene (DBACO) or diminazene. Fatty amine type catalyst comprises diethylenetriamine (DETA), triethylenetetramine (TETA) or polyethylene polyamine. Imidazole type catalyst comprises imidazolidiny urea, 2-ethyl-4-methylimidazole or their mixture. Metal and its salt comprise Al, Co, Ni, Cu, Fe, Zn, VO, Cr, Ti, Mn, K, Zr and its oxide, halide, sulfate, nitrate or phosphate coordination complex. Lewis acid comprises boron trifluoride (BF3) and its coordination complex. Lewis base comprises phosphorus compounds with linear or branch C1-C10 group, aromatic group or halide substituted group. Another kind of the catalyst comprises thiourea and its derivatives, titanate compounds or rare-earth element compounds.

Typically, adding amount of the catalyst is 1.5-15 wt. % based on weight of the thermoset materials.

In another aspect, the solvents comprise aprotic solvents or ionic liquids. The aprotic solvent comprises dimethylformamide (DMF), dimethylacetamide (DMAc), dimethyl sulfoxide (DMSO) or N-methyl pyrrolidone (NMP). The ionic liquid is a pyridinium cation type ionic liquid, a imidazolium cation type ionic liquid or its mixture, and its corresponding anion is selected from the group consisting of $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$ and $F(HF)2.3^-$.

The processing aid helps the copolymer form a homogeneous mixture with the thermoset material. Furthermore, the processing aid catalyzes interactions or reactions between the carbonate-carbamate copolymer and/or carbonate-based copolymer and the thermoset material. On the other hand, the hydroxyl compound, amino compound, amino-hydroxy compound or their mixture also reacts with the thermoset material to form an intermediate with a less molecule weight. The intermediate with a less molecule weight is more compatible with the carbonate-carbamate copolymer and/or carbonate-based copolymer.

Typically, the composition of the additive comprises 0.5-99.5 wt % of the copolymer and 99.5-0.5 wt. % of the processing aid.

In another aspect, the invention discloses a recyclable thermoset composition. Generally, the recyclable thermoset composition comprises the additive or the copolymer and a various thermoset material. The sum of the additive wt. % or the copolymer wt. % and the various thermoset material wt. % equals to 100 wt. %.

Specifically, the copolymer has at least one carbamate group, at least one carbonate group and/or at least one urea group, and weight percentage of the copolymer is 0.1-85 wt. % calculated on basis of total weight of the recyclable thermoset composition. The thermoset material comprises PU thermoset resin, PU foam, epoxy thermoset resin, phenol-formaldehyde thermoset resin, reinforced composite, benzoxazine thermoset resin, acrylate thermoset resin or their combination.

Typically, the additive or the copolymer is mixed or blended with the thermoset material to form the recyclable thermoset composition. Furthermore, the recyclable thermoset composition is a homogeneous or heterogeneous mixture.

Generally, the additive or the copolymer reacts with the thermoset materials at a higher temperature than its preparing/manufacturing temperature to produce various degradation products of the thermoset materials. The degradation products of the thermoset materials are to recycle and re-produce a new thermoset material.

In still another aspect, the invention discloses a process for recycling waste thermoset material. The process comprises following steps.

Step 1: provide a mixture that comprises the copolymer, at least one processing aid and at least one waste thermoset material, wherein the copolymer has at least one carbamate group, at least one carbonate group and/or at least one urea group, and weight percentage of the copolymer is 0.1-85 wt. % calculated on basis of total weight of the mixture.

Step 2: heat the mixture at temperature between 50 and 220° C. to obtain a product containing inorganic substances and organic substances.

Step 3: separate the inorganic substances and the organic substances from the product by extraction, crystallization, distillation, filtration or their combinations, wherein the organic substances comprise the higher molecular weight molecules and lower molecular weight molecules.

Step 4: separate the higher molecular weight molecules and lower molecular weight molecules from the organic substances by extraction, crystallization, distillation, filtration or their combinations, wherein the higher molecular weight molecules are to recycle or reuse as raw materials for producing epoxy resin, PU resin, benzoxazine thermoset resin, phenol-formaldehyde resin, acrylate thermoset resin, foaming material and composite.

Generally, the copolymer has at least one carbamate group, at least one carbonate group and/or at least one urea group, and a number-average molecular weight of the copolymer is between 100 and 50,000 Da.

Generally, the processing aid is a decomposer and comprises at least one catalyst and at least one solvent.

In one aspect, the catalysts comprise amines, imidazoles, metal and its salt, lewis acid or lewis base. The amine-type catalyst comprises quaternary ammonium compounds, dimethylamine, diethylamine, triethylamine, triethanolamine, dimethylethanolamine, N,N-dimethylaniline or pyridine. Amidine type catalyst comprises 1,8-Diazabicyclo[5.4.0]undec-7-ene (DBU),1,5-diazabicyclo[4.3.0]non-5-ene (DBACO) or diminazene. Fatty amine type catalyst comprises diethylenetriamine (DETA), triethylenetetramine (TETA) or polyethylene polyamine. Imidazole derivative comprises imidazolidiny urea, 2-ethyl-4-methylimidazole or their mixture. Metal and its salt comprise Al, Co, Ni, Cu, Fe, Zn, VO, Cr, Ti, Mn, K, Zr and its oxide, halide, sulfate, nitrate or phosphate coordination complex. Lewis acid comprises boron trifluoride (BF3) and its coordination complex. Lewis base comprises phosphorus compounds with linear or branch C1~C10 group, aromatic group or halide substituted group. Another kind of the catalyst comprises thiourea and its derivatives, titanate compounds or rare-earth element compounds.

Typically, adding amount of the catalyst is 1.5-15 wt. % based on weight of the thermoset materials.

In another aspect, the solvents comprise aprotic solvents or ionic liquids. The aprotic solvent comprises dimethylformamide (DMF), dimethylacetamide (DMAc), dimethyl sulfoxide (DMSO) or N-methyl pyrrolidone (NMP). The ionic liquid is a pyridinium cation type ionic liquid, a imidazolium cation type ionic liquid or its mixture. The corresponding anion is selected from the group consisting of $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$ and $F(HF)2.3^-$.

The inorganic substances comprise glass fiber, inorganic matrix and different types of inorganic fillers.

The organic substances comprise higher molecular weight molecules and lower molecular weight molecules.

The higher molecular weight molecules are recycled or reused as raw materials for producing epoxy resin, PU resin, phenol-formaldehyde resin, acrylate thermoset resin, benzoxazine thermoset resin, foaming material or composites.

The lower molecular weight molecules comprise urea, polyurea, cyclic-urea, cyclic urethane monomers or oligomers.

In conclusion, the invention discloses a novel additive for recycling thermoset material. The composition of the additive comprises a unique copolymer that has at least one carbamate group, at least one carbonate group and/or at least one urea group. The additive or the copolymer reacts with thermoset resins alone or in the presence of the processing aid at a higher temperature than its preparing/manufacturing temperature to produce various degradation products of the thermoset resins. The degradation products of the thermoset resins are to recycle and re-produce a new thermoset material. As a result, it is easy to recycle waste thermoset resins or materials by adding or mixing the additive or the copolymer into the waste thermoset resins or materials, follow by heating them to obtain a new recycling product. Accordingly, the invention provides a solution for total recycling thermoset materials and green chemistry.

EMBODIMENTS

Figure 1:
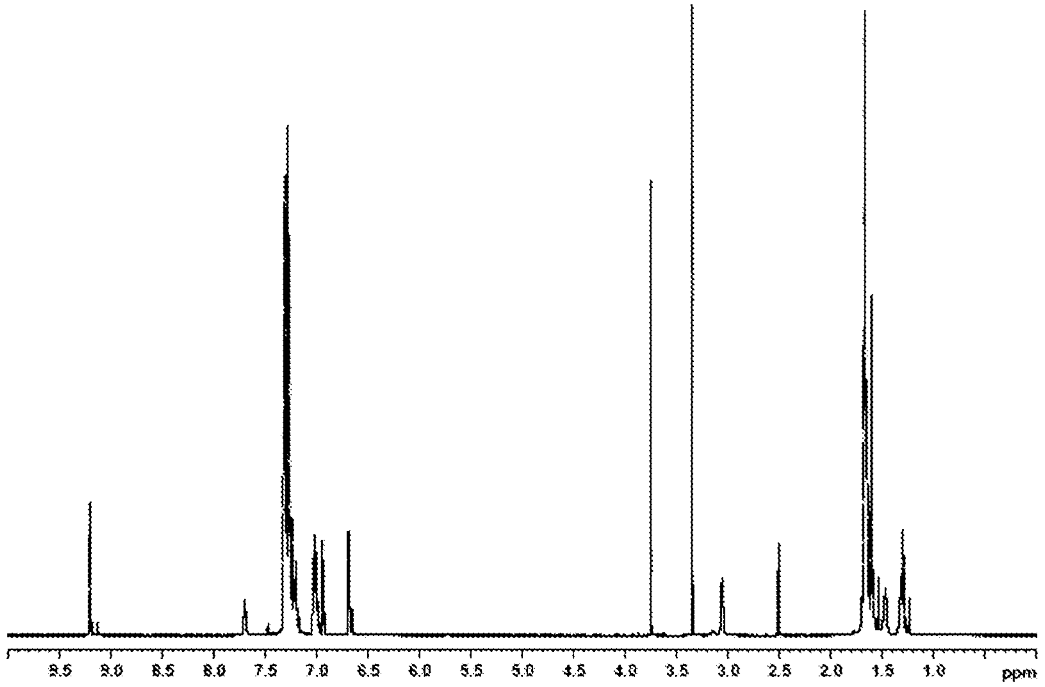
FIG. 1 is $^1$H-NMR spectrum of the copolymer PCC-0.25.

In a first embodiment, the invention discloses an additive for recycling thermoset material.

Specifically, a composition of the additive for recycling thermoset material comprises at least one copolymer. Preferably, the additive further comprises at least one processing aid.

Generally, the copolymer has at least one carbamate group, at least one carbonate group and/or at least one urea group, and a number-average molecular weight of the copolymer is between 100 and 50,000 Da.

On the other hand, the processing aid comprises amines, catalysts, solvents or their mixture. Preferably, the processing aid is a hydroxy compound, amino compound, amino-hydroxy compound or their mixture.

In one embodiment, the catalysts comprise amines, imidazoles, metal and its salts, Lewis acids or Lewis bases. The amine-type catalyst comprises quaternary ammonium compounds, dimethylamine, diethylamine, triethylamine, triethanolamine, dimethylethanolamine, N,N-dimethylaniline or pyridine. Amidine type catalyst comprises 1,8-Diazabicyclo[5.4.0]undec-7-ene (DBU),1,5-diazabicyclo[4.3.0]non-5-ene (DBACO) or diminazene. Fatty amine type catalyst comprises diethylenetriamine (DETA), triethylenetetramine (TETA) or polyethylene polyamine. Imidazole derivative comprises imidazolidiny urea, 2-ethyl-4-methylimidazole or their mixture. Metal and its salt comprise Al, Co, Ni, Cu, Fe, Zn, VO, Cr, Ti, Mn, K, Zr and its oxide, halide, sulfate, nitrate or phosphate coordination complex. Lewis acid comprises boron trifluoride (BF3) and its coordination complex. Lewis base comprises phosphorus compounds with linear or branch C1-C10 group, aromatic group or halide substituted group. Another kind of the catalyst comprises thiourea and its derivatives, titanate compounds or rare-earth element compounds.

Typically, adding amount of the catalyst is 1.5-15 wt. % based on weight of the thermoset materials.

In another embodiment, the solvents comprise aprotic solvents or ionic liquids. The aprotic solvent comprises dimethylformamide (DMF), dimethylacetamide (DMAc), dimethyl sulfoxide (DMSO) or N-methyl pyrrolidone (NMP). The ionic liquid is a pyridinium cation type ionic liquid or a imidazolium cation type ionic liquid, and its corresponding anion is selected from group consisting of $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$ and $F(HF)2.3^-$.

The processing aid help the copolymer form a homogeneous mixture with the thermoset material. Furthermore, the processing aid also catalyzes interactions or reactions between the carbonate-carbamate copolymer and/or carbonate-based copolymer and the thermoset material. On the other hand, the hydroxyl compound, amino compound, amino-hydroxy compound or their mixture reacts with the thermoset material to form intermediates with a less molecule weight. The intermediates with a less molecule weight are more compatible with the carbonate-carbamate copolymer and/or carbonate-based copolymers.

In one example of the first embodiment, the composition of the additive comprises 0.5-99.5 wt % of the copolymer and 99.5-0.5 wt. % of the processing aid. Preferably, the composition of the additive comprises 5-50 wt. % of the copolymer and 95-50 wt. % of the processing aid.

In one example of the first embodiment, the copolymer has at least one carbamate group, at least one carbonate group and/or at least one urea group, and a number-average molecular weight of the copolymer is between 100 and 50,000 Da.

In one example of the first embodiment, the copolymer is carbamate-carbonate copolymer, carbamate-urea copolymer, carbonate-urea copolymer, carbamate-carbonate-urea copolymer or their combination.

In one example of the first embodiment, the carbamate group has a structure as shown in formula (1) or formula (2).

Formula (1)

(1)

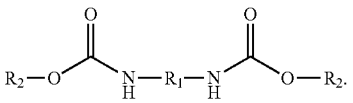

-continued

Formula (2)

(2)

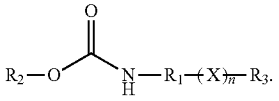

In one example of the first embodiment, $R_1$ is C2-C20 linear or branch alkyl group, C3-C8 cyclic alkyl group, polyether group having a molecular weight of 50-10,000 Da, or polysiloxane group having a molecular weight of 50-10,000 Da. $R_2$ is C2-C20 linear or branch alkyl group, C3-C8 cyclic alkyl group, phenyl group, C7-C20 alkyl phenyl group or C6-C20alkyl phenolic group. $R_3$ is hydroxyl group, amino group, carbonyl group, carboxylic group, ester group or amide group. X is C2-C20 linear or branch alkyl group, C3-C8 cyclic alkyl group, polyether group having a molecular weight of 50-10,000 Da, or polysiloxane group having a molecular weight of 50-10,000 Da; and n is an integer of 1-10.

In one example of the first embodiment, the carbonate group has a structure as shown in formula (3).

Formula (3)

(3)

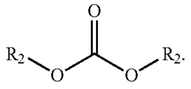

In one example of the first embodiment, $R_2$ is C2-C20 linear or branch alkyl group, C3-C8 cyclic alkyl group, phenyl group, C7-C20 alkyl phenyl group or C6-C20alkyl phenolic group.

In one example of the first embodiment, the urea group has a structure as shown in formula (4).

Formula (4)

(4)

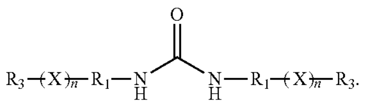

In one example of the first embodiment, $R_1$ is C2-C20 linear or branch alkyl group, C3-C8 cyclic alkyl group, polyether group having a molecular weight of 50-10,000 Da, or polysiloxane group having a molecular weight of 50-10,000 Da; $R_3$ is hydroxyl group, amino group, carbonyl group, carboxylic group, ester group or amide group; X is C2-C20 linear or branch alkyl group, C3-C8 cyclic alkyl group, polyether group having a molecular weight of 50-10,000 Da, or polysiloxane group having a molecular weight of 50-10,000 Da; and n is an integer of 1-10.

In one representative example of the first embodiment, the copolymer is a carbonate-carbamate copolymer that has a chemical structure as shown in formula (5).

Formula (5)

(5)

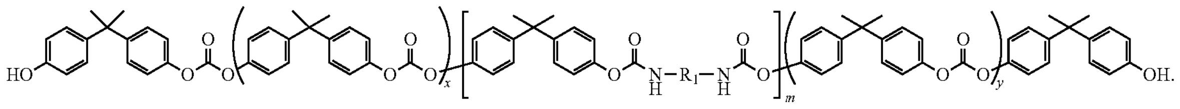

m = 1, 2, 3

In one example of the first embodiment, m is an integer of 1-100, each of x and y is an integer of 1-1000, respectively.

In one example of the first embodiment, the carbonate-carbamate copolymer as shown in formula (5) has a weight-average molecular weight ($M_w$) between 1,000 and 100,000 Da.

In one example of the first embodiment, the carbonate-carbamate copolymer as shown in formula (5) has a glass transition temperature more than 50° C. Preferably, the glass transition temperature ($T_g$) is more than 80° C.

In one example of the first embodiment, the processing aid comprises diphenyl carbonate, ethanolamine, bis-phenol A, anisole, PTMEG or their combination.

In one example of the first embodiment, the amino compound comprises primary amines, diamines, polyamines, or polyether diamines.

In another example of the first embodiment, the catalyst comprises metal catalyst or organic salts.

In a second embodiment, the invention discloses a recyclable thermoset composition.

Generally, the recyclable thermoset composition comprises the additive or the copolymer and a various thermoset material. The sum of the additive wt. % or the copolymer wt. % and the thermoset material wt. % equals to 100 wt. %.

Specifically, the copolymer has at least one carbamate group, at least one carbonate group and/or at least one urea group, and weight percentage of the copolymer is 0.1-85 wt. % based on total weight of the recyclable thermoset composition.

Typically, the additive or the copolymer is mixed or blended with the thermoset material to form the recyclable thermoset composition.

Generally, the additive or the copolymer reacts with the thermoset material at a higher temperature than its preparing/manufacturing temperature to produce various degradation products of the thermoset material. The degradation products of the thermoset material are to be recycled and re-produced to a new thermoset material.

The degradation products of the thermoset material comprise inorganic substances, higher molecular weight molecules/macromolecules and lower molecular weight molecules/small molecules.

The higher molecular weight molecules/macromolecules are capable of recycling as raw materials for producing epoxy resin, PU resin, phenol-formaldehyde resin, acrylate thermoset resin, foaming material or composite.

The lower molecular weight molecules comprise urea, polyurea, cyclic-urea, cyclic urethane monomers or oligomers.

In one example of the second embodiment, the recyclable thermoset composition is recyclable PU thermoset resin, recyclable PU foam, recyclable epoxy thermoset resin, recyclable phenol-formaldehyde thermoset resin, recyclable composites, recyclable benzoxazine thermoset resin or recyclable acrylate thermoset resin.

In one example of the second embodiment, the recyclable PU thermoset resin comprises 20-40 wt. % of the additive or the copolymer.

In one example of the second embodiment, the recyclable epoxy thermoset resin comprises 30-60 wt. % of the additive or the copolymer.

In one example of the second embodiment, the recyclable phenol-formaldehyde thermoset resin comprises 50-70 wt. % of the additive or the copolymer.

In one example of the second embodiment, the recyclable benzoxazine thermoset resin comprises 10-25 wt % of the additive or the invented copolymer.

In one example of the second embodiment, the recyclable composite comprises 35-85 wt. % of the additive or the copolymer.

In one example of the second embodiment, the recyclable acrylate thermoset resin comprises 30-60 wt. % of the additive or the copolymer.

In one example of the second embodiment, the copolymer is carbamate-carbonate copolymer, carbamate-urea copolymer, carbonate-urea copolymer, carbamate-carbonate-urea copolymer or their combination.

In one example of the second embodiment, the copolymer has a number-average molecular weight (M) between 100 and 50,000 Da.

In one example of the second embodiment, the thermoset material comprises PU thermoset resin, PU foam, epoxy thermoset resin, phenol-formaldehyde thermoset resin, reinforced composite, benzoxazine thermoset resin, acrylate thermoset resin or their combination.

In one example of the second embodiment, the carbamate group has a structure as shown in formula (1) or formula (2).

Formula (1)

(1)

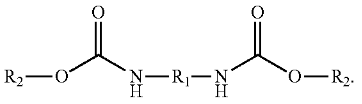

Formula (2)

(2)

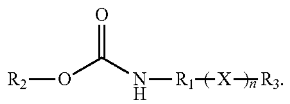

In one example of the second embodiment, $R_1$ is C2-C20 linear or branch alkyl group, C3-C8 cyclic alkyl group, polyether group having a molecular weight of 50-10,000 Da, or polysiloxane group having a molecular weight of 50-10,000 Da. $R_2$ is C2-C20 linear or branch alkyl group, C3-C8 cyclic alkyl group, phenyl group, C7-C20 alkyl phenyl group or C6-C20alkyl phenolic group. $R_3$ is hydroxyl group, amino group, carbonyl group, carboxylic group, ester group or amide group. X is C2-C20 linear or branch alkyl group, C3-C8 cyclic alkyl group, polyether group having a molecular weight of 50-10,000 Da, or polysiloxane group having a molecular weight of 50-10,000 Da; and n is an integer of 1-10.

In one example of the second embodiment, the carbonate group has a structure as shown in formula (3).

Formula (3)

(3)

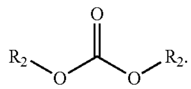

In one example of the second embodiment, $R_2$ is C2-C20 linear or branch alkyl group, C3-C8 cyclic alkyl group, phenyl group, C7-C20 alkyl phenyl group or C6-C20alkyl phenolic group.

In one example of the second embodiment, the urea group has a structure as shown in formula (4).

Formula (4)

(4)

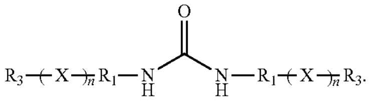

In one example of the second embodiment, $R_1$ is C2-C20 linear or branch alkyl group, C3-C8 cyclic alkyl group, polyether group having a molecular weight of 50-10,000 Da, or polysiloxane group having a molecular weight of 50-10,000 Da; $R_3$ is hydroxyl group, amino group, carbonyl group, carboxylic group, ester group or amide group; X is C2-C20 linear or branch alkyl group, C3-C8 cyclic alkyl group, polyether group having a molecular weight of 50-10,000 Da, or polysiloxane group having a molecular weight of 50-10,000 Da; and n is an integer of 1-10.

On the other hand, the recyclable thermoset composition further comprises 1.5-15 wt % of processing aid based on weight of the recyclable thermoset composition.

In another example of the second embodiment, the processing aid comprises amines, catalysts, solvents or their mixture. Preferably, the processing aid is a hydroxy compound, amino compound, amino-hydroxy compound or their mixture.

In one example of the second embodiment, the catalysts comprise amines, imidazoles, metal salts, lewis acids or lewis bases. The amine-type catalyst comprises quaternary ammonium compounds, dimethylamine, diethylamine, triethylamine, triethanolamine, dimethylethanolamine, N,N-dimethylaniline or pyridine. Amidine type catalyst comprises 1,8-Diazabicyclo[5.4.0]undec-7-ene (DBU),1,5-diazabicyclo[4.3.0]non-5-ene (DBACO) or diminazene. Fatty amine type catalyst comprises diethylenetriamine (DETA), triethylenetetramine (TETA) or polyethylene polyamine. Imidazole derivative comprises imidazolidiny urea, 2-ethyl-4-methylimidazole or their mixture. Metal and its salt comprise Al, Co, Ni, Cu, Fe, Zn, VO, Cr, Ti, Mn, K, Zr and its oxide, halide, sulfate, nitrate or phosphate coordination complex. Lewis acid comprises boron trifluoride (BF3) and its coordination complex. Lewis base comprises phosphorus compounds with linear or branch C1-C10 group, aromatic group or halide substituted group. Another kind of the catalyst comprises thiourea and its derivatives, titanate compounds or rare-earth element compounds.

Typically, adding amount of the catalyst is 1.5-15 wt. % based on weight of the thermoset materials.

In one example of the second embodiment, the solvents comprise aprotic solvents or ionic liquids. The aprotic solvent comprises dimethylformamide (DMF), dimethylacetamide (DMAc), dimethyl sulfoxide (DMSO) or N-methyl pyrrolidone (NMP). The ionic liquid is a pyridinium cation type ionic liquid or a imidazolium cation type ionic liquid, and its corresponding anion is selected from the group consisting of $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$ and $F(HF)2.3^-$.

In a third embodiment, the invention provides a process for recycling waste thermoset material. The process comprises following steps.

Step 1: provide a mixture comprises the copolymer, the processing aid and at least one waste thermoset material, wherein the copolymer has at least one carbamate group, at least one carbonate group and/or at least one urea group, and weight percentage of the copolymer is 0.1-85 wt. % based on total weight of the mixture.

Step 2: heat the mixture at temperature between 50 and 220° C. to obtain a product containing inorganic substances and organic substances.

Step 3: separate the inorganic substances and the organic substances from the product by extraction, crystallization, distillation, filtration or their combinations, wherein the organic substances comprise the higher molecular weight molecules and lower molecular weight molecules.

Step 4: separate the higher molecular weight molecules and lower molecular weight molecules from the organic substances by extraction, crystallization, distillation, filtration or their combinations, wherein the higher molecular weight molecules are recycled or reused as raw materials for producing epoxy resin, PU resin, benzoxazine thermoset resin, phenol-formaldehyde resin, acrylate thermoset resin, foaming material and composite.

In one example of the third embodiment, the copolymer is carbamate-carbonate copolymer, carbamate-urea copolymer, carbonate-urea copolymer, carbamate-carbonate-urea copolymer or their combinations.

In one example of the third embodiment, the copolymer has a number-average molecular weight (M) between 100 and 50,000 Da.

In one example of the third embodiment, the thermoset material comprises PU thermoset resin, PU foam, epoxy thermoset resin, phenol-formaldehyde thermoset resin, reinforced composite, benzoxazine thermoset resin, acrylate thermoset resin or their combination.

In one example of the third embodiment, the carbamate group has a structure as shown in formula (1) or formula (2).

Formula (1)

(1)

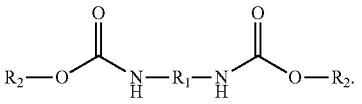

-continued

Formula (2)

(2)

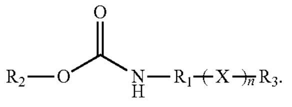

In one example of the third embodiment, $R_1$ is C2-C20 linear or branch alkyl group, C3-C8 cyclic alkyl group, polyether group having a molecular weight of 50-10,000 Da, or polysiloxane group having a molecular weight of 50-10,000 Da. $R_2$ is C2-C20 linear or branch alkyl group, C3-C8 cyclic alkyl group, phenyl group, C7-C20 alkyl phenyl group or C6-C20alkyl phenolic group. $R_3$ is hydroxyl group, amino group, carbonyl group, carboxylic group, ester group or amide group. X is C2-C20 linear or branch alkyl group, C3-C8 cyclic alkyl group, polyether group having a molecular weight of 50-10,000 Da, or polysiloxane group having a molecular weight of 50-10,000 Da; and n is an integer of 1-10.

In one example of the third embodiment, the carbonate group has a structure as shown in formula (3).

Formula (3)

(3)

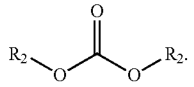

In one example of the third embodiment, $R_2$ is C2-C20 linear or branch alkyl group, C3-C8 cyclic alkyl group, phenyl group, C7-C20 alkyl phenyl group or C6-C20alkyl phenolic group.

In one example of the third embodiment, the urea group has a structure as shown in formula (4).

Formula (4)

(4)

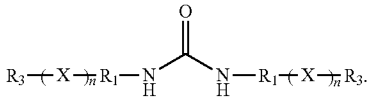

In one example of the third embodiment, $R_1$ is C2-C20 linear or branch alkyl group, C3-C8 cyclic alkyl group, polyether group having a molecular weight of 50-10,000 Da, or polysiloxane group having a molecular weight of 50-10,000 Da; $R_3$ is hydroxyl group, amino group, carbonyl group, carboxylic group, ester group or amide group; X is C2-C20 linear or branch alkyl group, C3-C8 cyclic alkyl group, polyether group having a molecular weight of 50-10,000 Da, or polysiloxane group having a molecular weight of 50-10,000 Da; and n is an integer of 1-10.

In another example of the third embodiment, the processing aid comprises amines, catalysts, solvents or their mixture. Preferably, the processing aid is a hydroxy compound, amino compound, amino-hydroxy compound or their mixture.

In another example of the third embodiment, the catalysts comprise amines, imidazoles, metal salts, lewis acids or lewis bases. The amine-type catalyst comprises quaternary ammonium compounds, dimethylamine, diethylamine, triethylamine, triethanolamine, dimethylethanolamine, N,N-dimethylaniline or pyridine. Amidine type catalyst comprises 1,8-Diazabicyclo[5.4.0]undec-7-ene (DBU),1,5-diazabicyclo[4.3.0]non-5-ene (DBACO) or diminazene. Fatty amine type catalyst comprises diethylenetriamine (DETA), triethylenetetramine (TETA) or polyethylene polyamine. Imidazole type catalyst comprises imidazolidiny urea, 2-ethyl-4-methylimidazole or their mixture. Metal and its salt comprise Al, Co, Ni, Cu, Fe, Zn, VO, Cr, Ti, Mn, K, Zr and its oxide, halide, sulfate, nitrate or phosphate coordination complex. Lewis acid comprises boron trifluoride (BF3) and its coordination complex. Lewis base comprises phosphorus compounds with linear or branch C1-C10 group, aromatic group or halide substituted group. Another kind of the catalyst comprises thiourea and its derivatives, titanate compounds or rare-earth element compounds.

Typically, adding amount of the catalyst is 1.5-15 wt. % based on weight of the thermoset materials.

In another example of the third embodiment, the solvents comprise aprotic solvents or ionic liquids. The aprotic solvent comprises dimethylformamide (DMF), dimethylacetamide (DMAc), dimethyl sulfoxide (DMSO) or N-methyl pyrrolidone (NMP). The ionic liquid is a pyridinium cation type ionic liquid or a imidazolium cation type ionic liquid, and its corresponding anion is selected from group consisting of $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$ and $F(HF)2.3^-$.

In one representative example of the third embodiment, waste polycarbonate reacts with diamines to obtain the carbonate-carbamate copolymer. Mix the carbonate-carbamate copolymer with waste epoxy resin to obtain the invented recyclable epoxy thermoset composition and then heat the invented recyclable epoxy thermoset composition to obtain the degradation product containing inorganic substances and organic substances. Isolate the inorganic substances and organic substances from the degradation product by extraction, crystallization, distillation, filtration or their combinations.

The inorganic substances are to recycle in fabrication of other materials.

The organic substances comprise the high molecular weight molecules and low molecular weight molecules.

The high molecular weight molecules are recycled or reused as raw materials for producing epoxy resin, PU resin, phenol-formaldehyde resin, acrylate thermoset resin, PU foam or composite.

The low molecular weight molecules are potential raw materials for producing fine chemicals and comprise urea, polyurea, cyclic-urea, cyclic urethane monomers or oligomers.

Representative examples of the invention are described as the following paragraphs.

Symbol $Td_5$ shown in following tables is a temperature when test sample lose 5 wt. % during TGA analysis. Symbol $T_g$ shown in following tables is glass transition-temperature of the test sample.

Example 1: General Procedure for Preparing the Copolymer (PCC (Poly(Carbonate-Carbamate) Copolymer)) as Shown in Formula (5)

Figure 2:
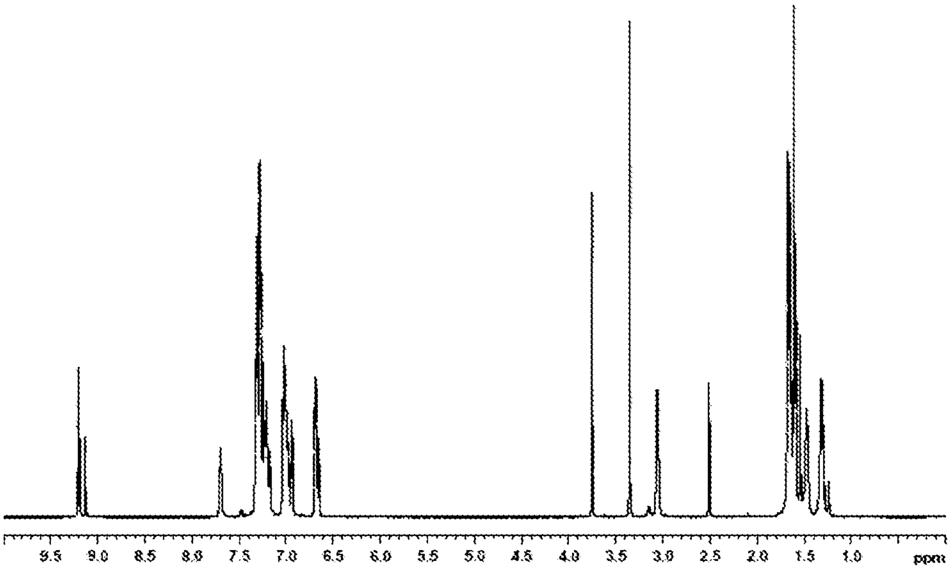
FIG. 2 is $^1$H-NMR spectrum of the copolymer PCC-0.5.
Figure 3:
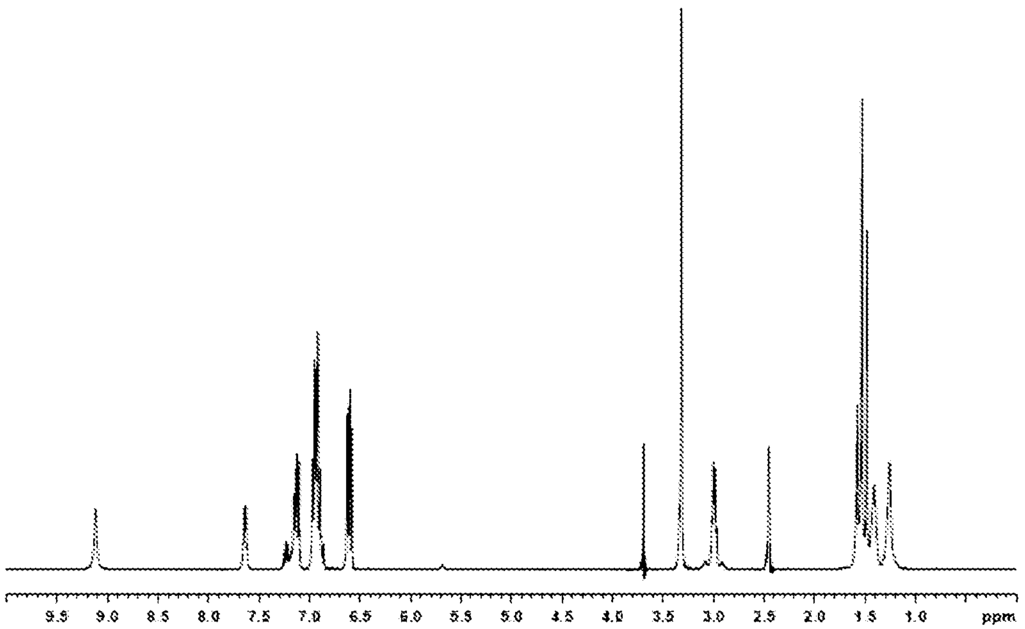
FIG. 3 is $^1$H-NMR spectrum of the copolymer PCC-0.99.
Figure 4:
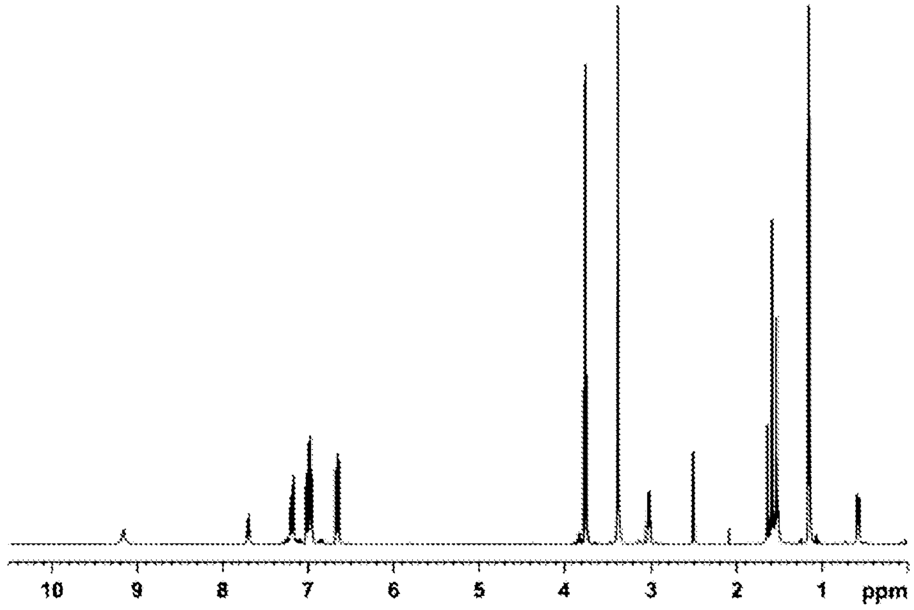
FIG. 4 is $^1$H-NMR spectrum of the copolymer PCC-1.0S.
Figure 5:
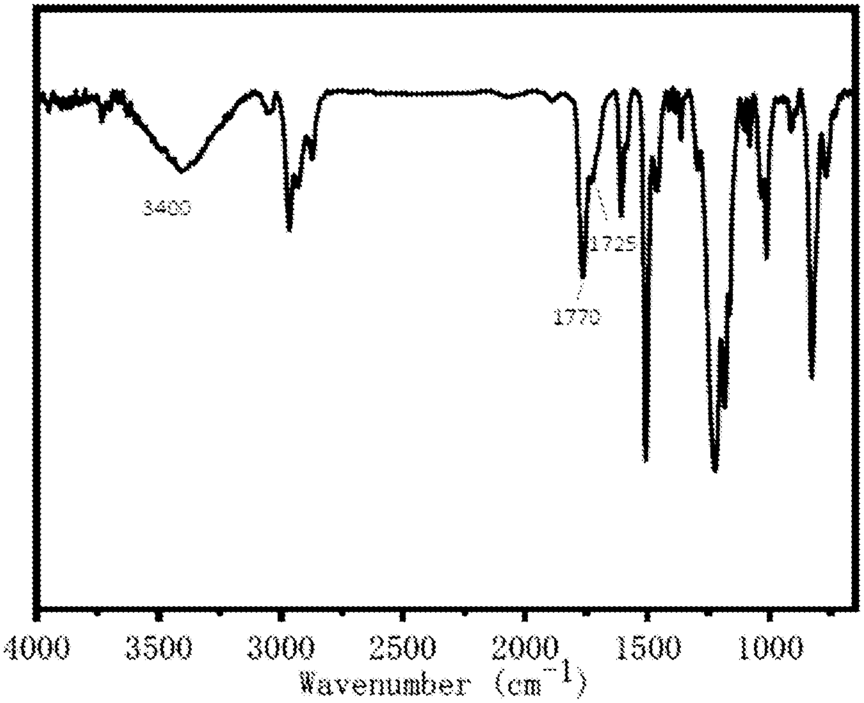
FIG. 5 is FTIR spectrum of the sample PCC-E1.
Figure 6:
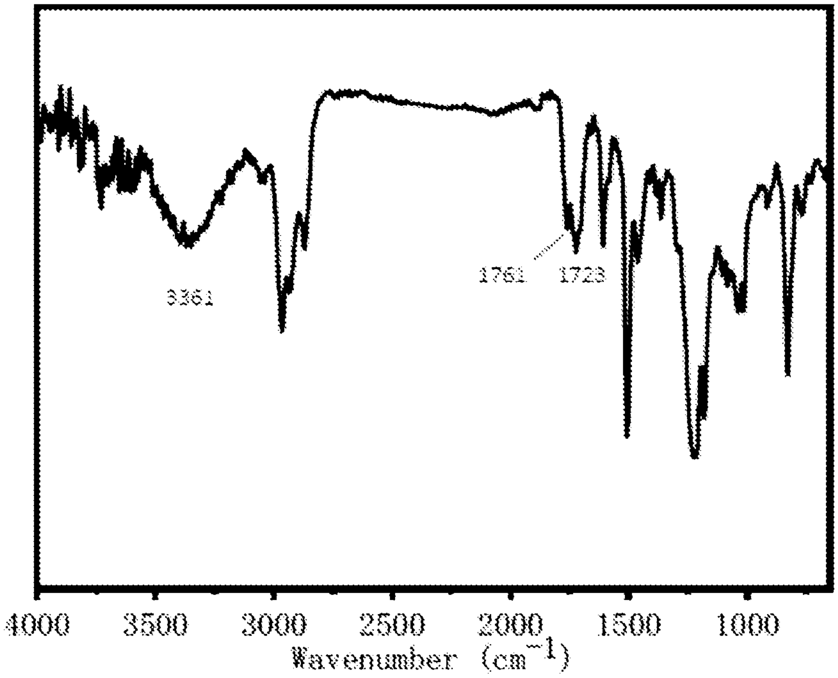
FIG. 6 is FTIR spectrum of the sample PCC-E1-M1.
Figure 7:
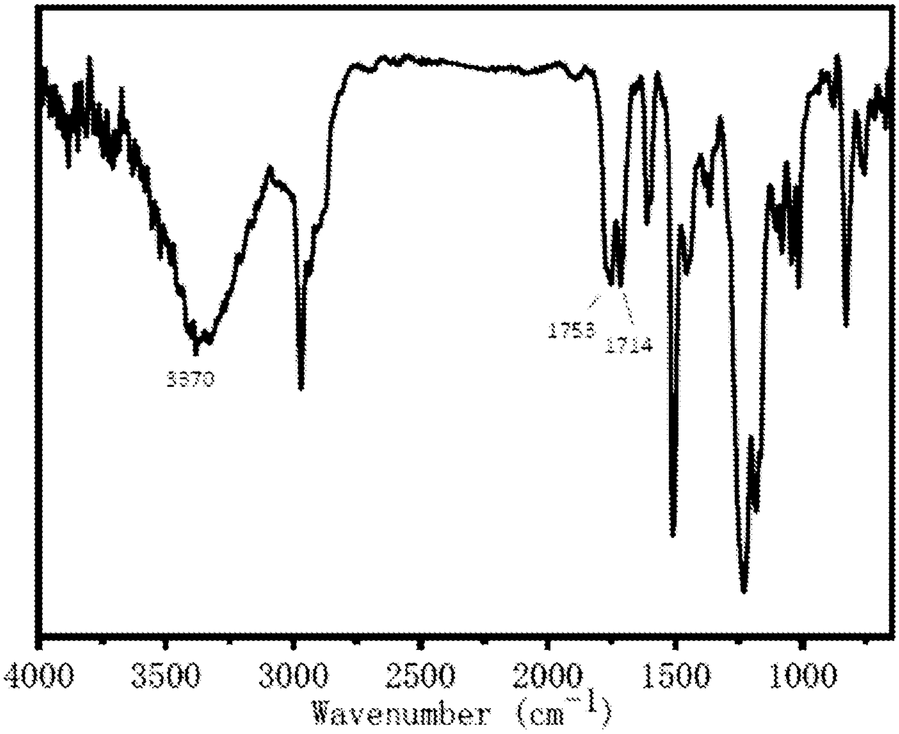
FIG. 7 is FTIR spectrum of the sample rEP-1.
Figure 8:
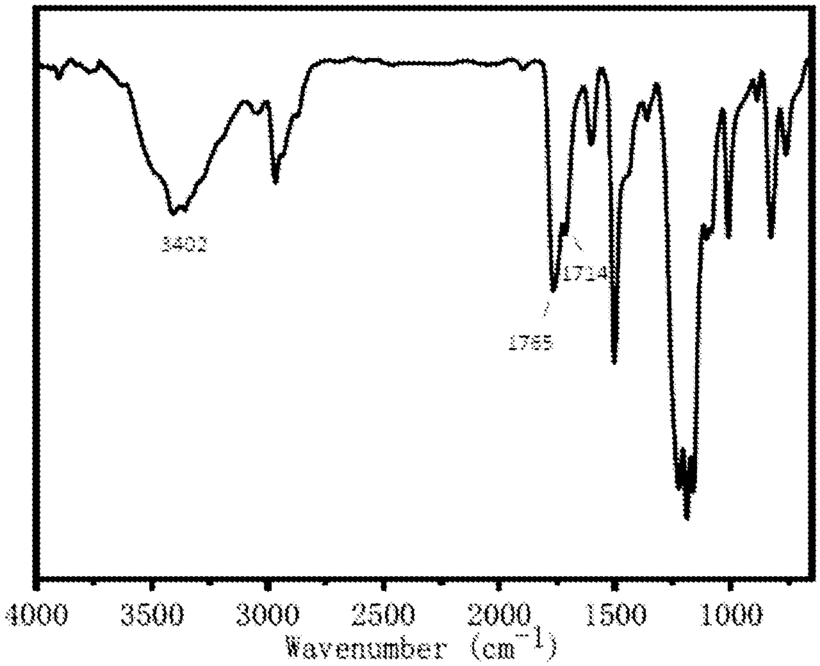
FIG. 8 is FTIR spectrum of the sample PCC-PF1.
Figure 9:
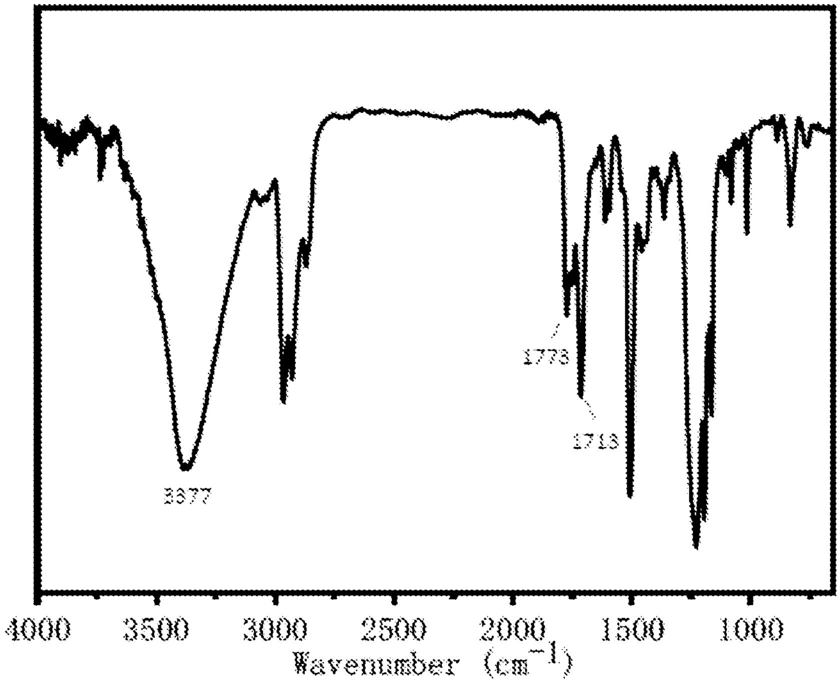
FIG. 9 is FTIR spectrum of the sample PCC-PF1-M1.
Figure 10:
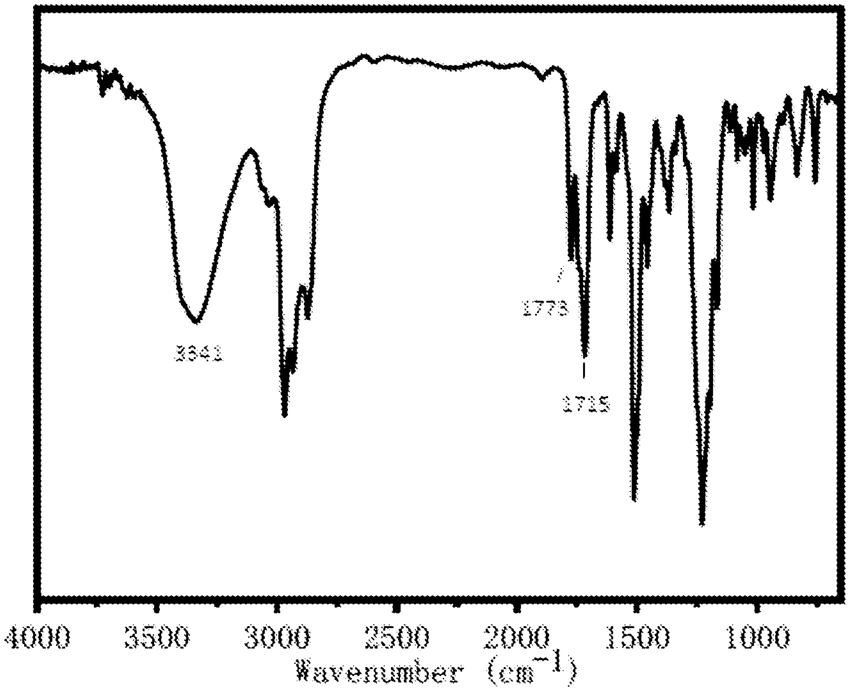
FIG. 10 is FTIR spectrum of the sample rPF-1.
Figure 11:
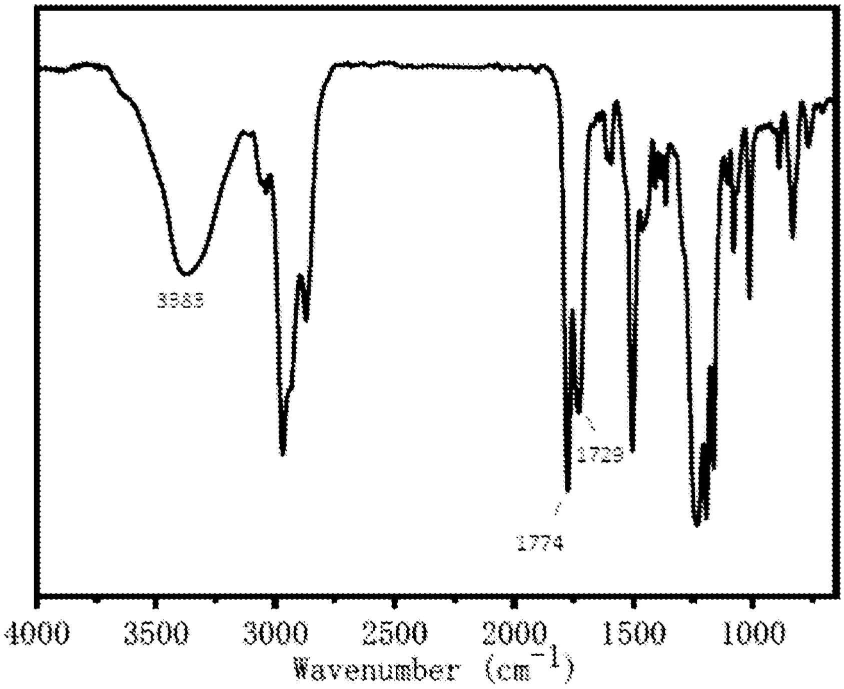
FIG. 11 is FTIR spectrum of the sample PCC-PMMA1.
Figure 12:
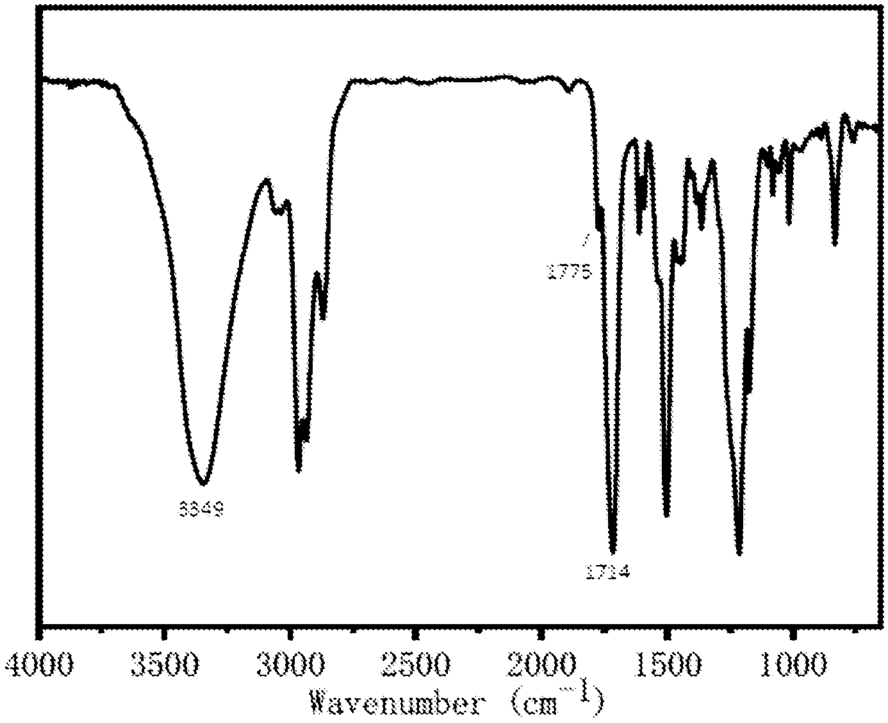
FIG. 12 is FTIR spectrum of the sample PCC-PMMA1-M1.
Figure 13:
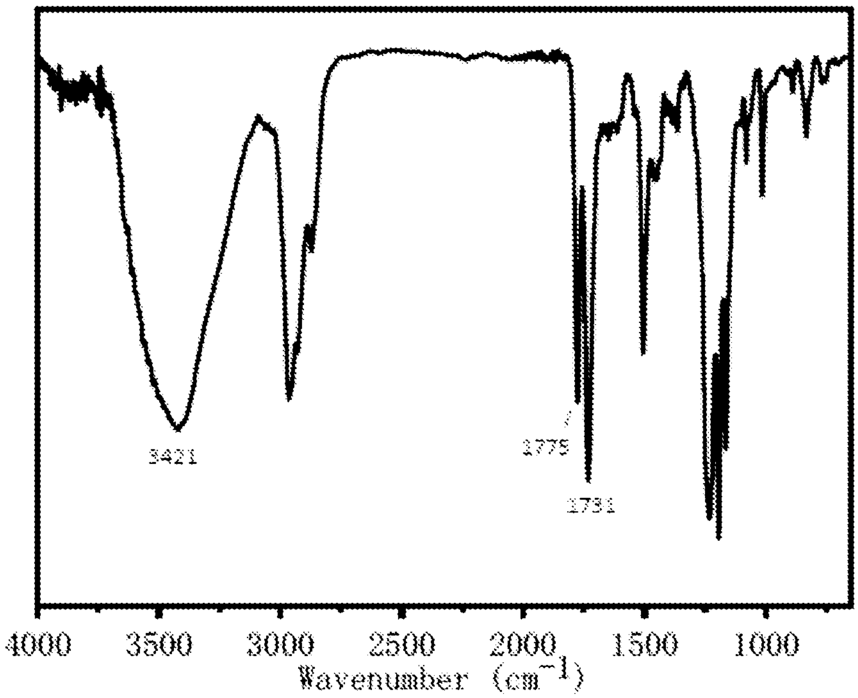
FIG. 13 is FTIR spectrum of the sample rPMMA-1.
Figure 14:
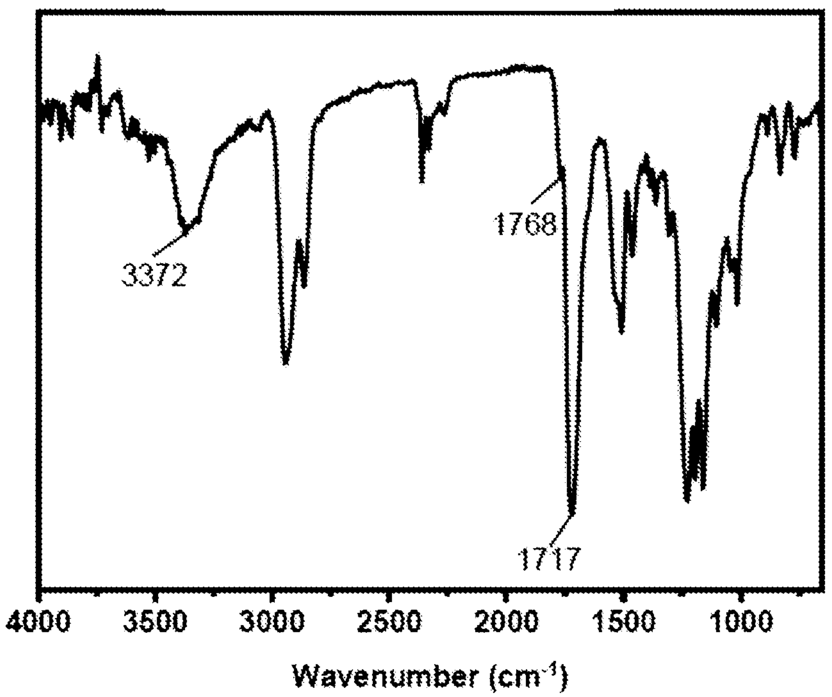
FIG. 14 is FTIR spectrum of the sample PCC-PU1.
Figure 15:
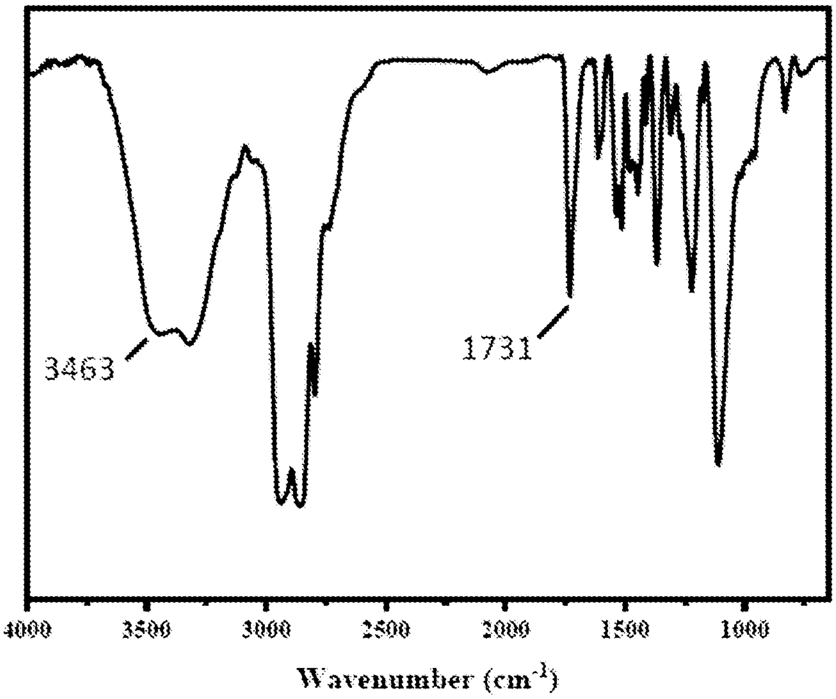
FIG. 15 is FTIR spectrum of the sample PCC-PU-T1.
Figure 16:
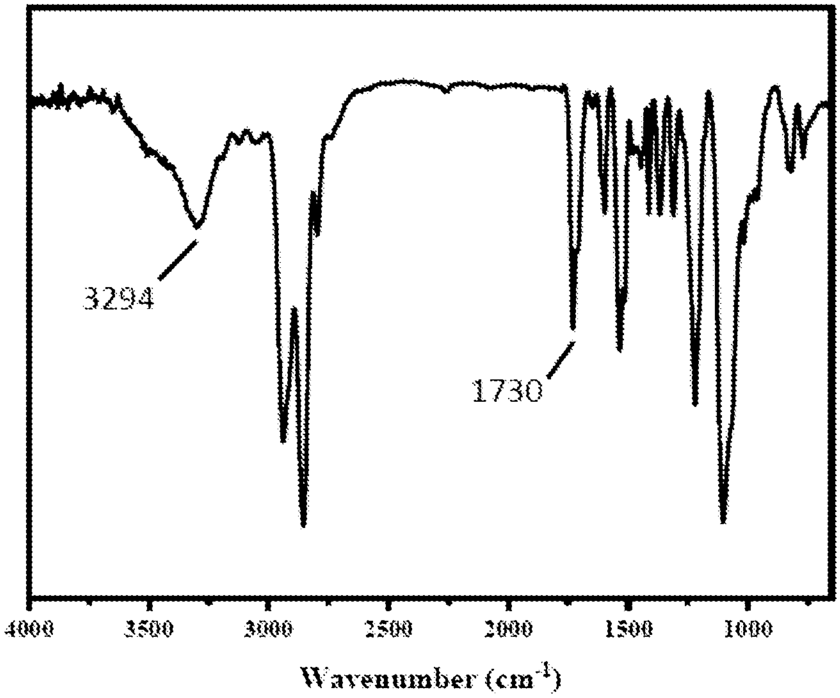
FIG. 16 is FTIR spectrum of the sample rPU-1.
Figure 17:
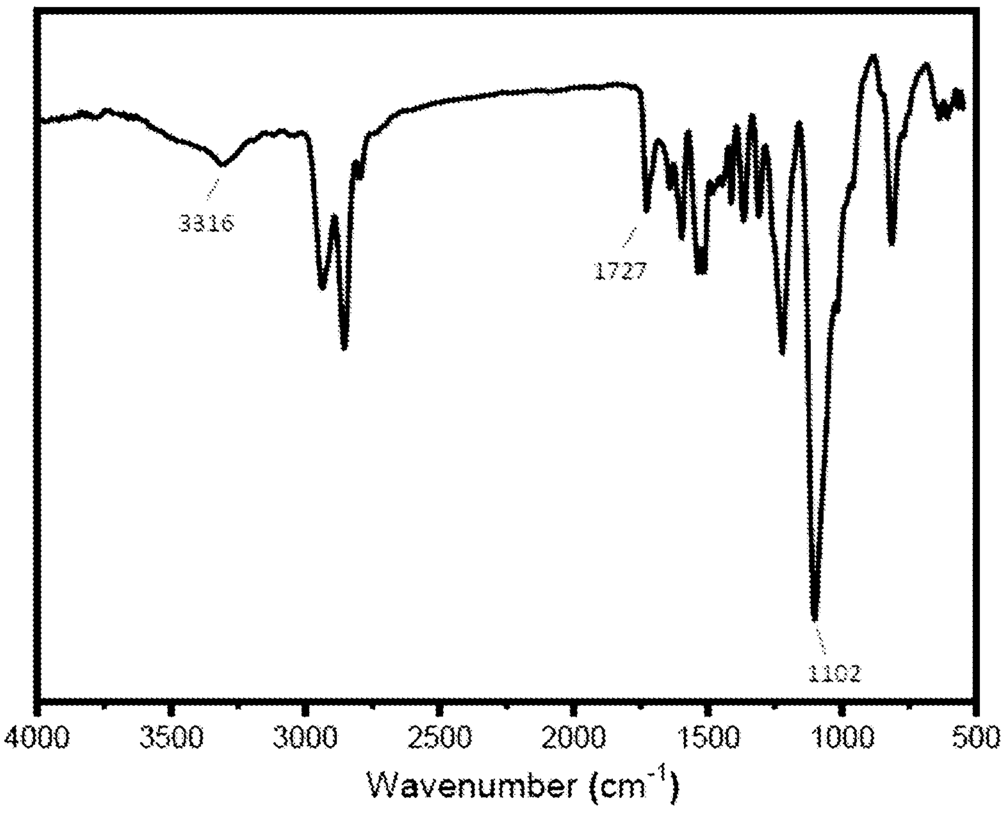
FIG. 17 is FTIR spectrum of the sample PCC-BZ1.
Figure 18:
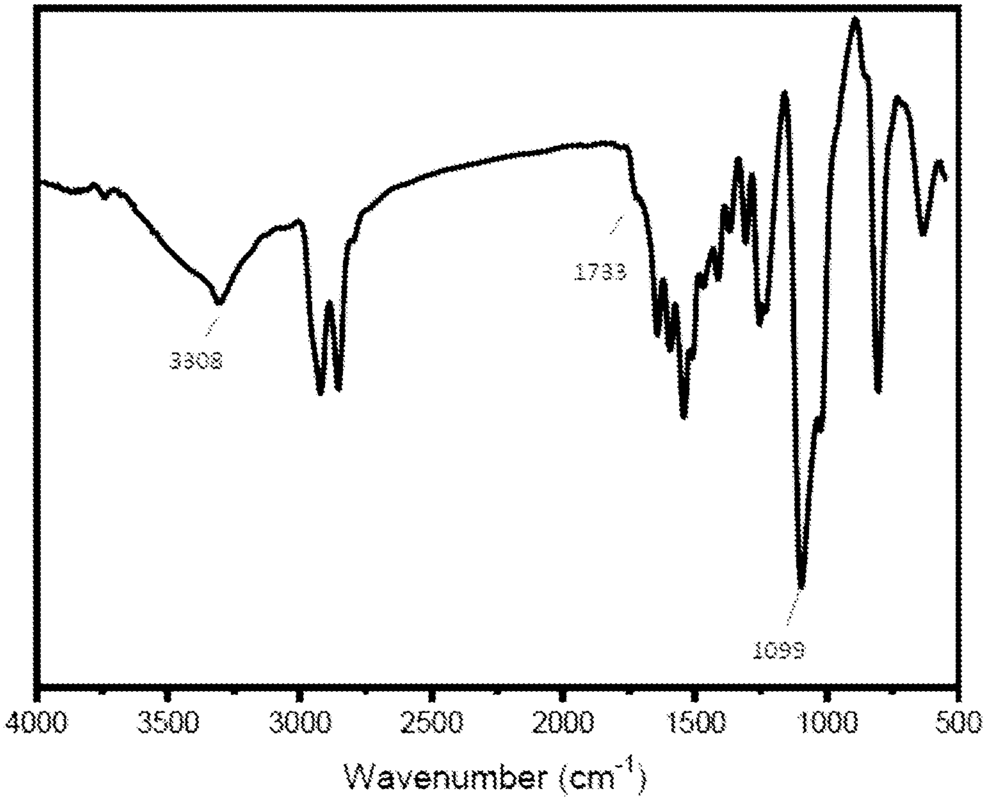
FIG. 18 is FTIR spectrum of the sample PCC-BZ1-T1.
Figure 19:
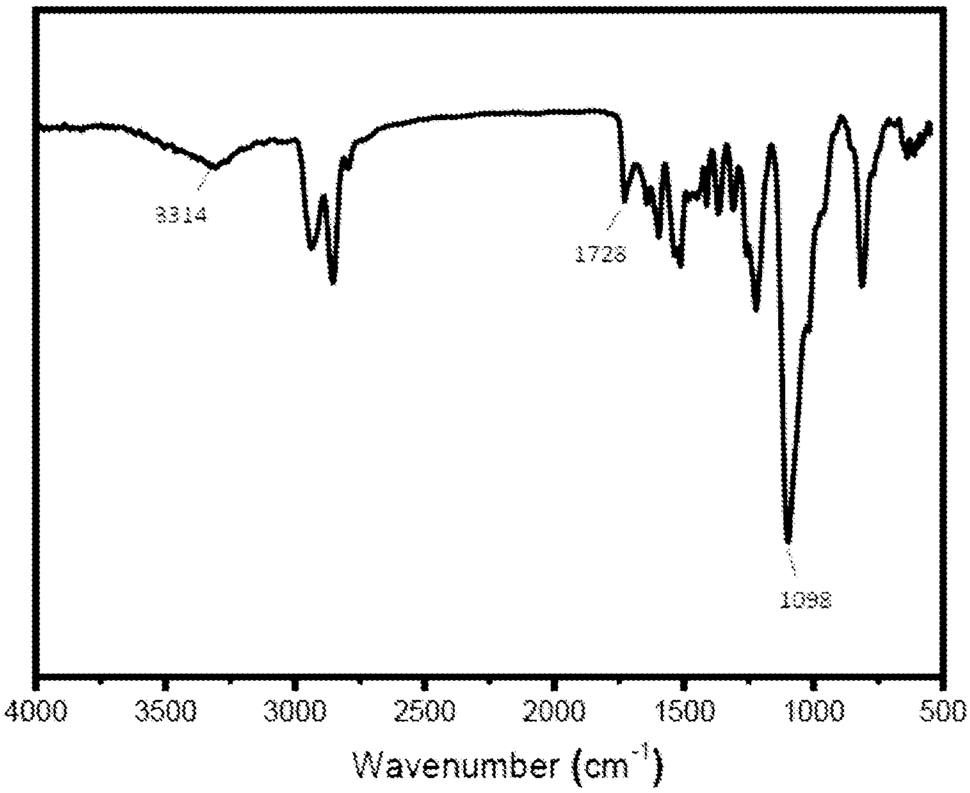
FIG. 19 is FTIR spectrum of the sample rBZ-1.
Figure 20:
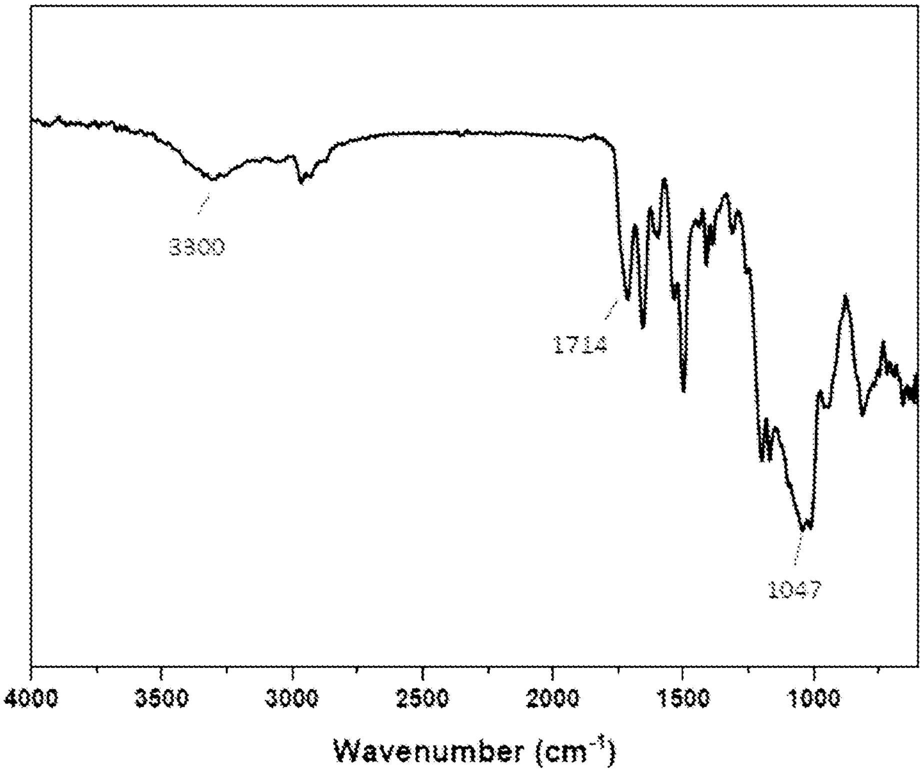
FIG. 20 is FTIR spectrum of the sample PCC-C1.
Figure 21:
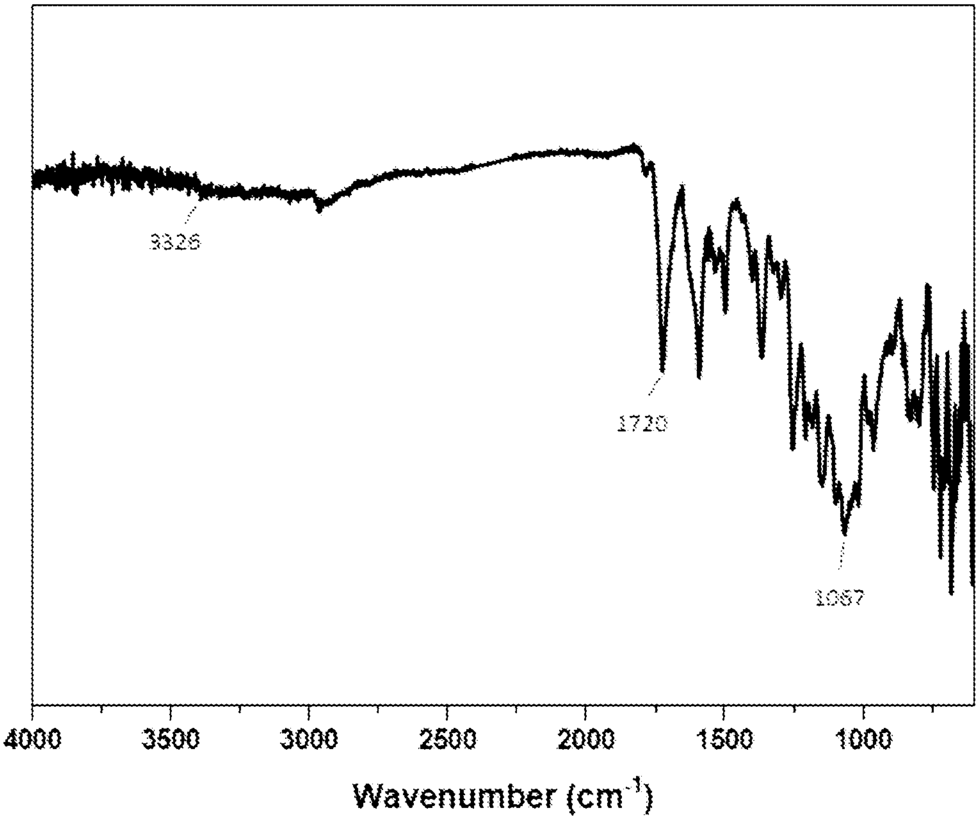
FIG. 21 is FTIR spectrum of the sample PCC-C1-R1.
Figure 22:
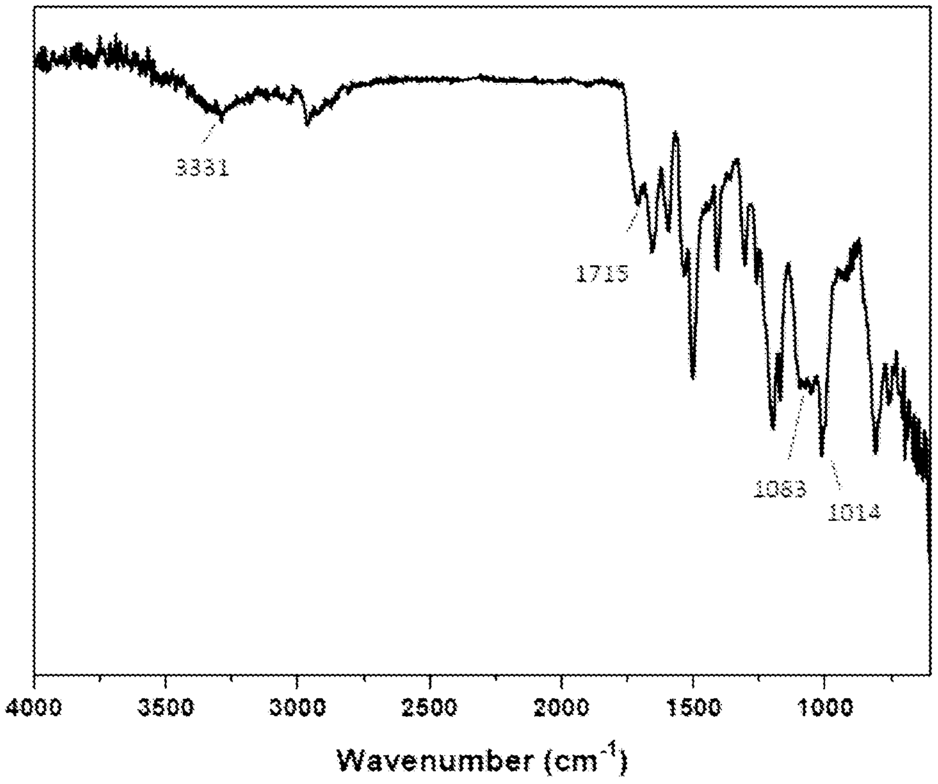
FIG. 22 is FTIR spectrum of the sample rC-1.

Firstly, polycarbonate (PC, 50-100 g) was placed in a nitrogen inlet round-bottom flask and dissolved in 500 ml of anisole at 75° C. Then, a alkyl or polyether diamine (10-20 g) was added into the flask and stirred for 3 hours. Finally, the anisole was removed by using vacuum distillation, and the chemical structure of the PCC (poly(carbonate-carbamate) copolymer) was characterized by $^1$H-NMR spectrum. The FTIR (KBr) results were shown as follows: IR (cm$^{-1}$, KBr): 3300 (—OH), 1775 (—C═O(carbonate)) and 1715 (—C═O (urethane)) The $^1$H-NMR (600 MHz, deuterated dimethyl sulfoxide [d-DMSO]) results were shown as follows: δ (ppm)=δ 1.20-1.40, δ 1.40-1.50, δ 1.50-1.80, δ 3.00-3.20, δ 3.70-3.90, δ 6.60-6.80, δ 6.85-7.10, δ 7.10-7.40, δ 7.60-7.80, δ 9.10-9.30. The symbol PCC-number means the total molar ratio of m segment in the structure as shown in formula (5). For example, PCC –0.5 means the total molar ratio of m segment in the structure as shown in formula (5) is 0.5. In brief, the number equals to m divided by the sum of x, y and m. According to the procedure, PCC-0.25, PCC-0.5, and PCC-0.99 are prepared, respectively. Their $^1$H-NMR spectrums are shown in FIG. 1, FIG. 2 and FIG. 3, respectively.

General Process for Total Recycling the Recyclable Thermoset Resins

The general process for recycling thermoset resins based on the additive/copolymer (PCC) can be digested the thermoset resins by using hydroxyl or amino agents such as mono, bi- tri-functional amine with aliphatic structures. Representatively, thermoset resins prepared from PCC (PCC-BZ, PCC-PF, PMMA/PCC, PCC-Bis-GMA, PCC-Bis-MA, PCC-PU, PCC-PUF or PCC-E resins with or without organic or inorganic fillers such as pellets, particles, fibers, sheets) was heated to a temperature ranging from 100 to 250° C. in the presence of ethanolamine. After 3 hours, the thermoset resins were completely dissolved in the solution and separated from the fillers. The as-prepared can be raw materials of thermosets again after separation process such as distillation or extraction the carbamate ester or urea group from phenolic compounds for the total recycling of thermoset resins and its composites. FTIR (KBr) results were shown as follows: IR (cm$^{-1}$, KBr): 3300-3400 (—OH of phenol and —COONH), 1716 (—C═O (carbamate) and 1670 (—C═O (urea)).

Example 2: Preparation of the Recyclable Epoxy Thermoset Resins (PCC-E)

Compositions as shown in table 1 are used to prepare the recyclable epoxy thermoset resins (PCC-E). The thermal properties (decomposing temperature and glass transition temperature) of the recyclable epoxy thermoset resins (PCC-E) are shown in table 2. Representatively, epoxy resin (DER332) was adding to system for epoxidation of DP-carbamates to form the recyclable epoxy thermoset resins. The invented additives/copolymers (PCC) are used with epoxy resin DER332 to prepare one-component epoxy resin. Dissolve PCC (3.00 g) in 20 ml anisole and place it in a 250 ml 2-neck flask with a stir bar. Stir and reflux at 75° C. under a nitrogen atmosphere. Continue stirring until PCC is completely dissolved. Subsequently, DER332 (6.20 g) was added to the flask with 4 ml of anisole solution, 0.1 wt % TPP was dissolved in 2 ml anisole into the reaction flask. The reaction was carried out at 120° C., and then most of the solvent was removed by distillation under reduced pressure. Reaction was heated and stirred for 24 hours under a nitrogen atmosphere. The experiment was monitored by nuclear magnetic resonance until the epoxy group of the epoxy resin no longer had a ring-opening reaction, indicating that the experiment was completed. The FTIR(KBr) results were shown as follows: IR (cm$^{-1}$, KBr): 3300 (—OH), 1775 (—C═O(carbonate)), 1715 (—C═O (urethane)) and 913 (oxirane). $^1$H-NMR (ppm, DMSO-d6): δ 1.20-1.40, δ 1.40-1.50, δ 1.50-1.70, δ 2.65-2.75, δ 2.80-2.90, δ 2.95-3.15, δ 3.25-3.40, δ 3.70-3.90, δ 3.90-4.20, δ 4.20-4.30, δ 6.60-6.70, δ 6.80-6.90, δ 6.90-7.05, δ 7.08-7.20, δ 7.20-7.40, δ 7.60-7.80, δ 9.10-9.30. In addition, epoxy resins can be curing to create 3D network using crosslinking agents such as polyether amines, aliphatic amines, cycloaliphatic amines, aromatic amines, polyimide, polyamic acids, modified aliphatic polyamines, tertiary amines, secondary amines, dicyandiamide, carboxylic acids, anhydrides, melamine/formaldehyde, urea/formaldehyde, phenol/formaldehyde or imido-modified curing agents. The presence of catalysts such as Lewis acids, Lewis base, and metal alkoxides, $BF_3$ complexes, ionic catalysts, dioxide catalysts or radical initiators. The curing process can be monitored in the consumption of oxirane functional group at peaks of around 913 cm$^{-1}$ by FTIR.

TABLE 1

| | Composition | | | | | | |
|---|---|---|---|---|---|---|---|
| PCC-E | Copolymer | Wt. % | Resin | Wt. % | Additive | Wt. % | FTIR (cm$^{-1}$) |
| PCC-E1 | PCC-0.25 | 50 | NPEL-128 | 50 | None | — | 3400<br>1700<br>1725 |
| PCC-E2 | PCC-0.25 | 50 | NPEL-128 | 40 | anhydride | 10 | — |
| PCC-E3 | PCC-0.25 | 50 | NPEL-128 | 49 | DETA | 1 | — |
| PCC-E4 | PCC-0.50 | 50 | NPEL-128 | 50 | None | — | 3368<br>1765<br>1725 |
| PCC-E5 | PCC-0.50 | 50 | NPEL-128 | 40 | anhydride | 10 | — |
| PCC-E6 | PCC-0.50 | 50 | NPEL-128 | 49 | DETA | 1 | — |
| PCC-E7 | PCC-0.99 | 50 | NPEL-128 | 50 | None | — | 3395<br>1705 |

*NPEL-128 is an epoxy resin which is manufactured from bisphenol-A and epichlorohydrin.
*DETA is diethylenetriamine.

TABLE 2

| PCC-E | $Td_5$(° C.) | Tg(° C.) |
|---|---|---|
| PCC-E1 | 305 | 132 |
| PCC-E2 | 347 | 93 |
| PCC-E3 | 289 | 126 |
| PCC-E4 | 356 | 110 |
| PCC-E5 | 324 | 105 |
| PCC-E6 | 329 | 109 |
| PCC-E7 | 338 | 107 |

Example 2-1: Recycling Process of the Recyclable Epoxy Thermoset Resins (PCC-E)

Please refer to table 3, the recyclable epoxy thermoset resin was mixed with decomposers, such as 1,8-Diazabicyclo[5.4.0]undec-7-ene (DBU), Zinc oxide (ZnO), Boron trifluoride (BF3) or Triethylenetetramine (TETA) and solvent (DMF, DMSO or NMP); and then heated to 70-220° C. to obtain decomposed epoxy product. Please refer to table 4, the decomposed epoxy product was mixed with resins (NPEL-128), and then cured by heating to obtain a new recycled epoxy resin. The new recycled epoxy resin has a similar FTIR spectrum to the original recyclable epoxy thermoset resin (PCC-E). Accordingly, the original recyclable epoxy thermoset resin (PCC-E) is capable of being total recycled.

TABLE 3

| Decomposed epoxy product | Decomposer(eq) | | Solvent (g) | | Temp (° C.) | Time (hour) |
|---|---|---|---|---|---|---|
| PCC-E1-M1 | DBU | 0.5 | DMF | 30 | 80 | 36 |
| PCC-E1-M2 | DBU | 1.0 | DMF | 30 | 80 | 4 |
| PCC-E1-M3 | DBU | 15 | DMF | 30 | 130 | 24 |
| PCC-E1-D1 | ZnO | 0.5 | DMF | 30 | 80 | 36 |
| PCC-E1-D2 | ZnO | 1.0 | DMF | 30 | 80 | 4 |
| PCC-E1-D3 | ZnO | 1.8 | DMF | 15 | 80 | 1.5 |
| PCC-E1-D4 | ZnO | 12.5 | DMSO | 30 | 150 | 48 |
| PCC-E2-M | DBU | 2.5 | DMSO | 30 | 130 | 24 |
| PCC-E2-D | BF3 | 12.5 | DMSO | 30 | 150 | 49 |
| PCC-E3-D | BF3 | 10.0 | DMSO | 30 | 150 | 49 |
| PCC-E4-M | DBU | 22.5 | DMSO | 30 | 130 | 96 |
| PCC-E4-D | BF3 | 12.5 | DMSO | 30 | 150 | 72 |
| PCC-E5-M | DBU | 10.0 | NMP | 30 | 130 | 72 |
| PCC-E5-D | TETA | 12.5 | NMP | 30 | 150 | 24 |
| PCC-E6-D | TETA | 12.5 | NMP | 30 | 150 | 46 |
| PCC-E7-D | TETA | 17.5 | NMP | 30 | 150 | 75 |

TABLE 4

| Recycled | Composition | | | | | | |
|---|---|---|---|---|---|---|---|
| epoxy resin | Decomposed epoxy product | Wt. % | Resin | Wt. % | $Td_5$ ° C. | Tg ° C. | FTIR ($cm^{-1}$) |
| rEP-1 | PCC-E1-M1 | 50 | NPEL-128 | 50 | 281 | 81 | 3370<br>1753<br>1714 |
| rEP-2 | PCC-E1-M2 | 50 | NPEL-128 | 50 | 340 | 87 | 3384<br>1751<br>1715 |
| rEP-3 | PCC-E1-D1 | 50 | NPEL-128 | 50 | 284 | 100 | 3350<br>1761<br>1714 |
| rEP-4 | PCC-E1-D2 | 50 | NPEL-128 | 50 | 354 | 112 | 3380<br>1749<br>1713 |

*NPEL-128 is an epoxy resin which is manufactured from bisphenol-A and epichlorohydrin.

Example 3: The Preparation of the Recyclable PU Thermoset Resins (PCC-PU) and Recyclable PU Foams (PCC-PUF)

For PCC-PU thermoset resins, compositions shown in table 5 are used to prepare the recyclable PU thermoset resins (PCC-PU). Thermal and mechanical properties of the PCC-PU are shown in table 6. Representatively, test samples were first prepared following a conventional two-step method. Anhydrous DMF, MDI, and PTMEG were added to a four-necked reaction vessel flask. The resulting mixture was heated at 60° C. and stirred vigorously by using an overhead mechanical stirrer under $N_2$ atmosphere for preparing PU prepolymer. After 2 h, PCC was dissolved in anhydrous DMF and then added dropwise into the isocyanate-terminated PU prepolymer for 1 h. Subsequently, the crosslinker TMP and catalyst DBTDL (2 mol % with respect to MDI) were added to facilitate the formation of cross-linked structure. On the other hand, the preparation of recyclable PU foams of PCC-PUF can be prepared by mixing the polyols and PCC were mixed into a Teflon beaker at 55° C. and stirred for 5 min at 750 rpm before adding the silicone oil, water and the amine catalyst. HDI and dibutyltin dilaurate were added after 5 more minutes, and the mixture was stirred for few seconds up to the whitening of the liquid (cream time). Stirring was then stopped, and the mixture was quickly poured into a Teflon close-top container and pre-heated at 55° C. Foams of PCC-PUF were kept in an oven at 55° C. for 1 h to permit the completion of the reaction and then stored at room temperature for 24 h before testing. The FTIR (KBr) results were shown as follows: IR ($cm^{-1}$, KBr): 3300-3400 (—COONH) and 1715 (—C═O (urethane)).

TABLE 5

| | Composition | | | | | | | | |
|---|---|---|---|---|---|---|---|---|---|
| PCC-PU | copolymer | Wt. % | Isocyanates | Wt. % | Polyol | Wt. % | | Wt. % | FTIR ($cm^1$) |
| PCC-PU1 | PCC-0.25 | 32.0 | IPDI | 23.2 | PLACELL 410 | 44.7 | T9 | 0.1 | 3372<br>1768<br>1717 |
| PCC-PU2 | PCC-0.99 | 30.3 | IPDI | 27.8 | PLACELL 410 | 41.7 | T9 | 0.1 | 3316<br>1717 |
| PCC-PU3 | DPC-0.25 | 25.6 | MDI | 14.9 | PTMEG 2000 | 47.6 | — | — | 3336<br>1770 |
| | | | | | PLACELL 410 | 11.9 | | | 1730 |
| PCC-PU4 | DPC-0.25 | 26.0 | IPDI | 13.4 | PTMEG 2000 | 48.4 | T9 | 0.1 | 3336<br>1768 |
| | | | | | PLACELL 410 | 12.1 | | | 1722 |
| PCC-PU5 | DPC-0.99 | 29.3 | MDI | 20.2 | PTMEG 2000 | 40.4 | — | — | 3323 |
| | | | | | PLACELL 410 | 10.1 | | | 1709 |
| PCC-PU6 | DPC-0.99 | 30.0 | IPDI | 18.4 | PTMEG 2000 | 41.3 | T9 | 0.1 | 3334 |
| | | | | | PLACELL 410 | 10.3 | | | 1721 |

* PLACELL 410 is a trade name of polyester polyol

**T9 is a kind of tin catalyst

TABLE 6

| PCC-PU | Tg (° C.) | Strain (%) | Stress (MPa) |
|---|---|---|---|
| PCC-PU1 | 47 | 698 | 3.7 |
| PCC-PU2 | 47 | 584 | 23.5 |
| PCC-PU3 | — | 210 | 3.6 |
| PCC-PU4 | — | 873 | 2.1 |
| PCC-PU5 | — | 1552 | 7.6 |
| PCC-PU6 | — | 277 | 5.2 |

Example 3-1 Recycling Process of the Recyclable PU Thermoset Resins (PCC-PU)

Please refer to table 7, the recyclable PU thermoset resins (PCC-PU) was mixed with 1,8-Diazabicyclo[5.4.0]undec-7-ene (DBU), Zinc oxide (ZnO), Boron trifluoride (BF3) or Triethylenetetramine (TETA) and solvent (DMF, DMSO or NMP); and then heated to 70-220° C. to obtain a decomposed PU product. Please refer to table 8, the decomposed PU product was mixed with diisocyanates (MDI) or polyols and then cured by heating to obtain a new recycled PU resin. The new recycled PU resin has a similar FTIR spectrum to the original recyclable PU thermoset resin (PCC-PU). Accordingly, the original recyclable PU thermoset resin (PCC-PU) is capable of being total recycled.

TABLE 7

| Decomposed | Decomposed composition | | | | Temp | |
|---|---|---|---|---|---|---|
| PU product | PU | Wt. % | decomposer | Wt. % | ° C. | Hour |
| PCC-PU5-T1 | PCC-PU5 | 29 | DBU | 71 | 130 | 4 |
| PCC-PU5-E1 | PCC-PU5 | 20 | 5wt. % ZnO in DMF | 80 | 130 | 4 |
| PCC-PU5-B1 | PCC-PU5 | 33 | BF3 | 67 | 160 | 4 |
| PCC-PU5-R1 | PCC-PU5 | 33 | TETA | 67 | 150 | 8 |

TABLE 8

| Re- | Composition | | | | | | | |
|---|---|---|---|---|---|---|---|---|
| cycled PU | Decomposed PU product | Wt. % | Iso-cyanate | Wt. % | FTIR ($cm^{-1}$) | Tg ° C. | Strain (%) | Stress (MPa) |
| rPU-1 | PCC-PU5-T1 | 90 | MDI | 10 | 3294 1730 | — | 2047 | 7.6 |
| rPU-2 | PCC-PU5-R1 | 76 | MDI | 24 | 3313 1711 | — | 1018 | 4.2 |
| rPU-3 | PCC-PU5-T1 | 40 | MDI | 13 | 3309 1711 | — | 1198 | 4.7 |
| | PCC-PU5-R1 | 40 | PLACELL 410 | 7 | | — | | |

*PLACELL 410 is a trade name of polyester polyol

Example 4: The Preparation of the Recyclable Acrylate Thermoset Resins (PCC-PMMA)

The invention includes the preparation of PCC-PMMA, PCC-Bis-GMA, PCC-Bis-MA and acrylate-modified derivatives based on the copolymer (PCC). Compositions as shown in table 9 are used to prepare the recyclable acrylate thermoset resins. For the preparation of recyclable PMMA, THF solutions of MMA/PCC (50/50 by weight) were film-cast and dried for one day at 60° C. Cast films were further dried under vacuum at 125° C. for one day. The films were cut into pieces and pressed into discs with a spacer at 200° C. These discs were annealed at 200° C. for one day to form phase blends. For the preparation of recyclable acrylate thermosets based on PCC-Bis-GMA crosslinker, a flask was charged with PCC (5 mmol), glycidyl methacrylate (GMA) (10 mmol) and N,N-dimethylbenzylamine (0.05 mmol). The Flask had continuous flow of argon, and the temperature was raised to 70° C., which was maintained for 6 h. After the reaction, the highly viscous liquid was transferred to a glass vial. For the preparation of recyclable acrylate thermosets based on PCC-Bis-MA crosslinker, PCC (1.18 mmol), methacrylic anhydride (1.88 mmol), 4-(dimethylamino)pyridine (DMAP) (0.01 mmol) and N,N-dimethylacetamide (DMAc) 10 mL were added to a 100-mL three-neck round-bottom flask equipped with a magnetic stirrer, and a nitrogen inlet. The reaction was carried out at room temperature for 24 h. Then, the solution was poured into methanol. The precipitate was filtered and dried at 80° C. overnight. The recyclable thermosets were realized through the presence of radical initiators such as organometallic compounds and metallic halides, such as triethylaluminum and titanium tetrachloride, halogen molecules, azo compounds (such as 2,2'-azobis (isobutyronitrile) (AIBN)) and organic and inorganic peroxides such as benzoyl peroxide, di-t-Butyl peroxide, or the addition of a nucleophile such as an acid, alcohol, amine or thiol, to an alkene using the transition metal. The crosslinking reaction can be monitored using the IR to monitor the disappearance of acrylic groups. The FTIR (KBr) results were shown as follows: IR ($cm^{-1}$, KBr): 3300-3400 (—COONH) 1715 (—C═O (urethane) and 1600-1680 (—C═C (acrylic)).

TABLE 9

| | Composition | | | | | | | | |
|---|---|---|---|---|---|---|---|---|---|
| PCC-PMMA | co-polymer | Wt. % | mono-mer | Wt. % | Initiator | ppm | $Td_5$ (° C.) | Tg (° C.) | FTIR ($cm^{1}$) |
| PCC-PMMA1 | PCC-0.25 | 50 | MMA | 50 | BPO | 10000 | 196 | 92 | 3383 1774 1729 |
| PCC-PMMA2 | PCC-0.5 | 50 | MMA | 50 | BPO | 9000 | 248 | 99 | 3367 1775 1718 |
| PCC-PMMA3 | PCC-0.99 | 50 | MMA | 50 | BPO | 9000 | 230 | 108 | 3353 1719 |

Example 4-1: Recycling Process of the Recyclable Acrylate Thermoset Resins (PCC-PMMA)

Please refer to table 10, the recyclable acrylate thermoset resin was mixed with decomposing reagents, such as 1,8-Diazabicyclo[5.4.0]undec-7-ene (DBU), Zinc oxide (ZnO), Boron trifluoride (BF3) or Triethylenetetramine (TETA) and solvent (DMF, DMSO or NMP); and then heated to 70-220° C. to obtain decomposed PMMA product. Please refer to table 11, the decomposed PMMA product was mixed with the copolymer and then cured by heating to obtain a new recycled PMMA resin. The new recycled PMMA resin has a similar FTIR spectrum to the original recyclable acrylate thermoset resin (PCC-PMMA). Accordingly, the original recyclable acrylate thermoset resin (PCC-PMMA) is capable of being total recycled.

TABLE 10

| Decomposed | Decomposed reagents | | | | | |
|---|---|---|---|---|---|---|
| PMMA product | Decomposer | eq | solvent | (g) | ° C. | hour |
| PCC-PMMA1-M1 | DBU | 0.5 | DMSO | 30 | 80 | 6 |
| PCC-PMMA1-M2 | ZnO | 1.0 | DMF | 30 | 80 | 1 |
| PCC-PMMA1-D1 | BF3 | 0.5 | NMP | 30 | 80 | 6 |
| PCC-PMMA1-D2 | TETA | 1.0 | NMP | 30 | 80 | 1 |

TABLE 11

| | Composition | | | | | | |
|---|---|---|---|---|---|---|---|
| Recycled PMMA | Decomposed PMMA product | Wt. % | Co-polymer | Wt. % | $Td_5$ (° C.) | Tg (° C.) | FTIR ($cm^1$) |
| rPMMA-1 | PCC-PMMA1-D1 | 50 | PCC-0.25 | 50 | 199 | 80 | 3421<br>1775<br>1731 |
| rPMMA-2 | PCC-PMMA1-D1 | 50 | PCC-0.5 | 50 | 236 | 94 | 3382<br>1775<br>1730 |

Example 5: The Preparation of the Recyclable Phenol-Formaldehyde Thermoset Resins (PCC-PF)

Compositions as shown in table 12 are used to prepare the recyclable phenol-formaldehyde thermoset resin (PCC-PF). The recyclable phenol-formaldehyde thermoset resins were prepared with different mixtures of PCC and Phenol reacting with Formaldehyde in the presence of an alkaline catalyst. Phenol was replaced with PCC-0.5 up to 40% by weight in the synthesis. The reactions were carried out in a glass reactor equipped with a stirrer, a condenser, and an internal heating unit. The required amounts of Phenol (88 wt. % in water), PCC and formaldehyde were mixed by keeping the molar ratio of total Phenol (Phenol+PCC) to Formaldehyde at 1:1.25 for the first set of resins, then 1:1.50 for the second set, and 1:2.0 for the last set. An aqueous solution of NaOH-46% (4%, w/w, on basis of total Phenol) was employed as the catalyst. The temperature was maintained at 60° C. for 1 h, then rise to 80° C. for 1 h, and finally reduced to 60° C. for 1 h. The chosen acidic catalyst for curing of the resin blends was a mix of xylene-sulfonic and phosphoric acids with water, which cures the phenolic resins relatively slowly and therefore enable better control and properties to be achieved. An amount of 3-4 wt. % of the catalyst was normally used. Clearly, the presence of the resins increased the gel-time of the blended resins. After curing the test specimens at room temperature for 8 h, the samples were postured at 80° C. inside of an oven for 4 h. The reaction was monitored by using FTIR to obtain the thermoset formation in the presence of PCC and phenol-formaldehyde (PF) characteristics. FTIR (KBr) results were shown as follows: IR ($cm^{-1}$, KBr): 3300-3400 (—COONH), 1715 (—C═O (urethane) and 1470 (methylene of PF resins).

TABLE 12

| | Composition | | | | | | |
|---|---|---|---|---|---|---|---|
| PCC-PF | Copolymer | Wt. % | Resin | Wt. % | $Td_5$ ° C. | Tg ° C. | FTIR ($cm^1$) |
| PCC-PF1 | PCC-0.25 | 70 | KB-3640N | 30 | 352 | 93 | 3402<br>1765<br>1714 |

TABLE 12-continued

| | Composition | | | | | | |
|---|---|---|---|---|---|---|---|
| PCC-PF | Copolymer | Wt. % | Resin | Wt. % | $Td_5$ ° C. | Tg ° C. | FTIR ($cm^1$) |
| PCC-PF2 | PCC-0.25 | 70 | KB-3570H | 30 | 323 | 116 | 3357<br>1750<br>1709 |
| PCC-PF3 | PCC-0.25 | 50 | KB-3640N | 50 | 298 | 90 | — |
| PCC-PF4 | PCC-0.25 | 50 | KB-3570H | 50 | 333 | 66 | — |
| PCC-PF5 | PCC-0.50 | 50 | KB-3640N | 50 | 325 | — | — |
| PCC-PF6 | PCC-0.50 | 50 | KB-3570H | 50 | 351 | — | — |
| PCC-PF7 | PCC-0.99 | 50 | KB-3640N | 50 | 337 | — | — |
| PCC-PF8 | PCC-0.99 | 50 | KB-3570H | 50 | 354 | — | — |

* KB-3640N is a kind of phenolic-formaldehyde resin
** KB-3570H is another kind of phenolic-formaldehyde resin Example 5-1: Recycling Process of the Recyclable Phenol-Formaldehyde Thermoset Resin Please refer to table 13, the recyclable phenol-formaldehyde thermoset resin was mixed with decomposing reagents, such as 1,8-Diazabicyclo[5.4.0]undec-7-ene (DBU), Zinc oxide (ZnO), Boron trifluoride (BF3) or Triethylenetetramine (TETA) and solvent (DMF, DMSO or NMP); and then heated to 70-220° C. to obtain a decomposed PF product. Please refer to table 14, the decomposed PF product was mixed with a resin or the copolymer and then cured by heating to obtain a new recycled PF resin. The new recycled PF resin has a similar FTIR spectrum to the original recyclable phenol-formaldehyde thermoset resin (PCC-PF). Accordingly, the original recyclable phenol-formaldehyde resin (PCC-PF) is capable of being total recycled.

TABLE 13

| Decomposed | Decomposed reagents | | | | Temp | |
|---|---|---|---|---|---|---|
| PF product | Decomposer | Eq | Solvent | W(g) | ° C. | Hour |
| PCC-PF1-M1 | DBU | 0.5 | DMF | 30 | 80 | 32 |
| PCC-PF1-M2 | DBU | 1.0 | DMF | 30 | 80 | 6 |
| PCC-PF1-D1 | ZnO | 0.5 | DMF | 30 | 80 | 32 |
| PCC-PF1-D2 | ZnO | 1.0 | DMF | 30 | 80 | 6 |
| PCC-PF2-M1 | BF3 | 0.5 | DMSO | 30 | 80 | 4 |
| PCC-PF2-M2 | TETA | 1.0 | NMP | 30 | 80 | 2 |
| PCC-PF2-D1 | TETA | 0.5 | NMP | 30 | 80 | 4 |
| PCC-PF2-D2 | TETA | 1.0 | NMP | 30 | 80 | 2 |

TABLE 14

| | composition | | | | | | |
|---|---|---|---|---|---|---|---|
| Recycled PF | Decomposed PF product | Wt. % | Resin | Wt. % | $Td_5$ (° C.) | Tg (° C.) | FTIR ($cm^1$) |
| rPF-1 | PCC-PF1-D1 | 50 | KB-3570H | 50 | 347 | 76 | 3341<br>1773<br>1715 |
| rPF-2 | PCC-PF1-D1 | 50 | PCC-0.25 | 50 | 339 | 97 | 3360<br>1770<br>1711 |

Example 6: The Preparation of the Recyclable Composites (PCC-C)

Compositions as shown in table 15 are used to prepare the recyclable composites (PCC-C). Representatively, the copolymer (PCC) was placed in a nitrogen inlet round-bottom flask and dissolved in 50 mL of anisole at 75° C. Then, the APTES (20 mmol) was added into the flask and stirred for 3 hours. The anisole was removed by vacuum distillation to obtain PCC-1.08. Diisocyanates, such as MDI or IPDI and/or polyols were introduced to prepare the silane-containing PU. The diisocyanates, polyols and PCC-1.0S mixtures were dissolved and polymerized in dry DMF with a NCO-to-OH ratio of 1:1. The polymerization was carried out in a nitrogen inlet, round-bottom flask at 80° C. for 3 hours to avoid moisture during addition polymerization. The previous silane-containing precursor and TEOS (or Silicon nanoparticles) solutions were diluted to 10 wt. % with DMF, then one drop of concentrated hydrochloric acid (HCl, 12 M) and five drops of deionised water were added. These homogeneous mixtures were poured into Teflon plates and placed in a 60° C. oven, with the temperature gradually increased to 100° C. at a rate of 10° C./h. Finally, after maintaining the oven temperature at 100° C. for 6 h, the PU/$SiO_2$ nanohybrids were obtained. FTIR. For pristine PC polymer, a distinct peak at 1773 $cm^{-1}$ represented the existence of carbonate group. After the conversion, the disappeared peak of carbonate, and the newly emergence signal at 1716 $cm^{-1}$ of the urethane group indicating the formation of transcarbonation. Besides, the signal at 956 $cm^{-1}$ of —Si—OR on the ethoxy-silane group was monitored after PC digestion. This result indicates the success of PC conversion into a PC-based monomer mixture with heterofunctional groups, i.e., phenolic carbamates bearing both silane and hydroxyl functional group. The chemical structures were monitored by using FT-IR spectra. After reaction was completed, a newly emerged peak at 1721 $cm^{-1}$ is corresponding to the formation of urethane linkages after PU polymerization. Besides, the signal at 953 $cm^{-1}$ of —Si—OR on the ethoxy-silane group were observed after two step polymerizations for silane-containing sample. The disappearance of signal around 950 $cm^{-1}$ corresponding to —Si—OR of ethoxy-silane group, and the emergence of signal at 1015-1050 and 800 $cm^{-1}$ of the —Si—O—Si— silica formation was observed. The existence of 1721 $cm^{-1}$ of carbamate group along with the formation of silica group indicating formation of composites after the sol-gel process. FTIR (KBr) results were shown as follows: IR ($cm^{-1}$, KBr): 3300-3400 (—COONH), 1716 (—C═O (urethane), 1015-1050, 956 (Si—OR) and 800 $cm^{-1}$ [—Si—O—Si—, silica group]).

TABLE 15

| | Composition | | | | | | |
|---|---|---|---|---|---|---|---|
| PCC-C | PCC | Wt. % | Iso-cyanates | Wt. % | Polyol | Wt. % | FTIR ($cm^1$) |
| PCC-C1 | PCC-1.0S | 81.2 | IPDI | 18.8 | — | — | 3300, 1714, 1047 |
| PCC-C2 | PCC-1.0S | 39.9 | IPDI | 18.5 | PEG 1000 | 42.6 | 3322, 1721, 1102, 1018 |
| PCC-C3 | PCC-1.0S | 39.9 | IPDI | 18.5 | PTMEG 1000 | 42.6 | — |
| PCC-C4 | PCC-1.0S | 39.9 | IPDI | 18.5 | PCDL 1000 | 42.6 | — |
| PCC-C5 | PCC-1.0S | 79.3 | MDI | 20.7 | — | — | — |
| PCC-C6 | PCC-1.0S | 39.0 | MDI | 20.3 | PEG 1000 | 40.7 | — |
| PCC-C7 | PCC-1.0S | 39.0 | MDI | 20.3 | PTMEG 1000 | 40.7 | — |
| PCC-C8 | PCC-1.0S | 39.0 | MDI | 20.3 | PCDL 1000 | 40.7 | — |

Example 6-1 Recycling Process of the Recyclable Composites

Please refer to table 16, the recyclable composite was mixed with decomposing reagents/decomposers, such as 1,8-Diazabicyclo[5.4.0]undec-7-ene (DBU), Zinc oxide (ZnO), Boron trifluoride (BF3) or Triethylenetetramine (TETA), and solvent (DMF, DMSO or NMP); and then heated to 70-220° C. to obtain the decomposed composite. Please refer to table 17, the decomposed composite was mixed with MDI and then cured by heating to obtain a new recycled composite. The new recycled composite has a similar FR spectrum to the original recyclable composite (PCC-C). Accordingly, the recyclable composite is capable of being total recycled.

TABLE 16

| | Composition | | | | | | |
|---|---|---|---|---|---|---|---|
| Decomposed composite | Recyclable Composite | Wt. % | decom-poser | Wt. % | Temp ° C. | Hour | FTIR ($cm^1$) |
| PCC-C-R1 | PCC-C1 | 33 | DBU | 67 | 200 | 3 | 3326 1720 1016 |
| PCC-C-E1 | PCC-C1 | 33 | TETA | 67 | 200 | 1 | — |

TABLE 17

| | Composition | | | | |
|---|---|---|---|---|---|
| Recycled composite | Decomposed composite | Wt. % | Isocyanate | Wt. % | FTIR ($cm^{-1}$) |
| rC-1 | PCC-C1-R1 | 75 | MDI | 25 | 3331, 1715, 1083 1014 |
| rC-2 | PCC-C1-E1 | 80 | MDI | 20 | — |

Example 7: The Preparation of the Recyclable Benzoxazine Thermoset Resins (PCC-BZ)

Compositions as shown in table 18 are used to prepare the recyclable benzoxazine resins (PCC-BZ). Representatively, the composition was added into isopropyl alcohol and refluxed for 3 days to complete the reaction, and subsequently, the reaction solvent, such as isopropyl alcohol, was removed using a rotary evaporator. The resulting gummy product was dissolved in chloroform and washed three times with 1 N NaOH. The solution was further dried with anhydrous $MgSO_4$. The FTIR spectrum of PCC-BZ showed significant bands respectively at 1215 (asymmetric stretching of C—O—C), 1030 (symmetric stretching of C—O—C) and 960 $cm^{-1}$ (tri-substituted benzene ring) typical of benzoxazine ring structure. After curing process, the disappearance of IR characteristics of BZ functional groups providing the recyclable PCC-BZ thermosets. FTIR (KBr) results were shown as follows: IR ($cm^{-1}$, KBr): 3300-3400 (—COONH), 1715 (—C═O (urethane), 1215 (asymmetric stretching of C—O—C), 1030 (symmetric stretching of C—O—C), and 930-960 $cm^{-1}$ (benzoxazine).

TABLE 18

| | | | | | | | | | FTIR |
|---|---|---|---|---|---|---|---|---|---|
| | Composition | | | | | | | | |
| PCC-BZ | Copolymer | Wt. % | Reagents | Wt. % | Isocyanate | Wt. % | Polyol | Wt. % | $(cm^{1})$ |
| PCC-BZ1 | PCC-0.99 | 18 | 6-amino-1-hexanol<br>paraformaldehyde | 8<br>4 | MDI | 25 | PTMEG<br>2000 | 45 | 3316<br>1727<br>1102 |
| PCC-BZ2 | PCC-0.99 | 18 | 6-amino-1-hexanol<br>paraformaldehyde | 8<br>4 | MDI | 25 | PCDL<br>2000 | 45 | 3349<br>1738<br>1246 |
| PCC-BZ3 | PCC-0.99 | 13.5 | 6-amino-1-hexanol<br>paraformaldehyde | 6<br>3 | MDI | 20 | PTMEG<br>2000 | 57.5 | — |
| PCC-BZ4 | PCC-0.99 | 13.5 | 6-amino-1-hexanol<br>paraformaldehyde | 6<br>3 | MDI | 20 | PCDL<br>2000 | 57.5 | — |

Example 7-1: Recycling Process of the Recyclable Benzoxazine Resins

Please refer to table 19, the recyclable benzoxazine thermoset resin (PCC-BZ) was mixed with decomposing reagents/decomposers, such as 1,8-Diazabicyclo[5.4.0]undec-7-ene (DBU), Zinc oxide (ZnO), Boron trifluoride (BF3) or Triethylenetetramine (TETA), and solvent (DMF, DMSO or NMP); and then heated to 70-220° C. to obtain a decomposed BZ product. Please refer to table 20, the decomposed BZ product was mixed with the copolymer (PCC-0.99), 6-amino-1-hexanol, paraformaldehyde and MDI, and then cured by heating to obtain a new recycled benzoxazine resin. The new recycled benzoxazine resin has a similar FTIR spectrum to the original recyclable benzoxazine thermoset resins (PCC-BZ). Accordingly, the recyclable benzoxazine thermoset resin (PCC-BZ) is capable of being total recycled.

TABLE 19

| Decomposed BZ | Composition | | | | | |
|---|---|---|---|---|---|---|
| product | BZ | Wt. % | decomposer | Wt. % | Temp | Hour |
| PCC-BZ1-T1 | PCC-BZ1 | 33 | DBU | 67 | 150 | 12 |
| PCC-BZ1-T2 | PCC-BZ1 | 33 | TETA | 67 | 120 | 4 |

TABLE 20

| | Composition | | | | |
|---|---|---|---|---|---|
| Recycled BZ | Decomposed BZ product | Wt. % | Reagents | Wt. % | FTIR $(cm^{1})$ |
| rBZ-1 | PCC- BZ1-T1 | 55 | PCC-0.99<br>6-amino-1-hexanol<br>paraformaldehyde<br>MDI | 14.7<br>6.5<br>3.3<br>20.5 | 3314<br>1728<br>1098 |

Example 8: Preparation of Recyclable Thermoset Resins Precursors in Aqueous Dispersants (PCC-BZ, PCC-PF, PCC-PMMA, PCC-Bis-GMA, PCC-Bis-MA, PCC-PU, PCC-PUF or PCC-E)

In the first step, thermoset resins precursors prepared from PCC (PCC-BZ, PCC-PF, PCC-PMMA, PCC-Bis-GMA, PCC-Bis-MA, PCC-PU, PCC-PUF or PCC-E) were dissolved in polar solvents such as MEK (or THF) at room temperature, mixed with emulsifiers (such as Jeffamine M2070, M1000 or ED2003), and stirred under 2000-rpm for 1 h, where the weight ratio of PCC:emulsfier:MEK was 20:3:17. Subsequently, deionized water was added to the epoxy resin solution by using a syringe pump at a rate of 1 g/min in the water/oil weigh ratio over 0.5. After reduced pressure distillation process, thermoset resins precursors in aqueous dispersants were prepared from PCC having solid contents of 5-70 wt %. After curing process, coating or painting with thermoplastic or thermoset structures can be achieved monitoring using FT-IR analysis. FTIR(KBr) results were shown as follows: IR ($cm^{-1}$, KBr): 3300-3400 $cm^{-1}$ (—COONH) 1715 $cm^{-1}$ (—C═O (urethane), 1215 $cm^{-1}$ (asymmetric stretching of C—O—C), 1030 $cm^{-1}$ (symmetric stretching of C—O—C), 930-960 $cm^{-1}$ (benzoxazine); 1015-1050 $cm^{-1}$, 956 (Si—OR), 800 $cm^{-1}$ [—Si—O—Si—, silica group]); 1470 $cm^{-1}$ (methylene of PF resins); 1600-1680 $cm^{-1}$ (—C═C (acrylic)); 1600-1680 $cm^{-1}$ (—C═C (acrylic)); 913 $cm^{-1}$ (oxirane).

Obviously, many modifications and variations are possible in the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. An additive for recycling thermoset materials, comprising a copolymer that is a poly(carbonate-carbamate) copolymer and has at least one carbamate group and at least one carbonate group, and a number-average molecular weight of the poly(carbonate-carbamate) copolymer is between 100 and 50,000 Da.

2. The additive for recycling thermoset materials of claim 1, wherein the carbamate group has a structure as shown in formula (1);

(1)

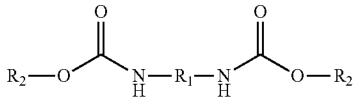

where $R_1$ is C2-C20 linear or branch alkyl group, C3-C8 cyclic alkyl group, polyether group having a molecular weight of 50-10,000 Da, or polysiloxane group having a molecular weight of 50-10,000 Da;

$R_2$ is C2-C20 linear or branch alkyl group, C3-C8 cyclic alkyl group, phenyl group, C7-C20 alkyl phenyl group or C6-C20 alkyl phenolic group.

3. The additive for recycling thermoset materials of claim 1, wherein the carbonate group has a structure as shown in formula (3), (3)

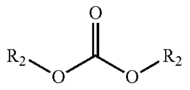

where $R_2$ is C2-C20 linear or branch alkyl group, C3-C8 cyclic alkyl group, phenyl group, C7-C20 alkyl phenyl group or C6-C20 alkyl phenolic group.

4. A recyclable thermoset composition, comprising a copolymer and a thermoset material, wherein the copolymer is a poly(carbonate-carbamate) copolymer and has at least one carbamate group and at least one carbonate group, and weight percentage of the poly(carbonate-carbamate) copolymer is 0.1-85 wt. % based on total weight of the recyclable thermoset composition.

5. The recyclable thermoset composition of claim 4, wherein the copolymer has a number-average molecular weight ($M_n$) between 100 and 50,000 Da.

6. The recyclable thermoset composition of claim 4, wherein the thermoset material comprises PU thermoset resin, PU foam, epoxy thermoset resin, phenol-formaldehyde thermoset resin, reinforced composite, benzoxazine thermoset resin, acrylate thermoset resin or their combination.

7. The recyclable thermoset composition of claim 4, wherein the carbamate group has a structure as shown in formula (1);

(1)

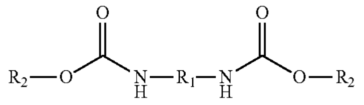

where $R_1$ is C2-C20 linear or branch alkyl group, C3-C8 cyclic alkyl group, polyether group having a molecular weight of 50-10,000 Da, or polysiloxane group having a molecular weight of 50-10,000 Da;

$R_2$ is C2-C20 linear or branch alkyl group, C3-C8 cyclic alkyl group, phenyl group, C7-C20 alkyl phenyl group or C6-C20 alkyl phenolic group.

8. The recyclable thermoset composition of claim 4, wherein the carbonate group has a structure as shown in formula (3), (3)

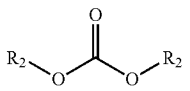

where $R_2$ is C2-C20 linear or branch alkyl group, C3-C8 cyclic alkyl group, phenyl group, C7-C20 alkyl phenyl group or C6-C20 alkyl phenolic group.

9. A process for recycling waste thermoset material, comprising, (1) providing a mixture that comprises at least one copolymer, at least one processing aid and at least one waste thermoset material, wherein the copolymer is a poly(carbonate-carbamate) copolymer and has at least one carbamate group and, at least one carbonate group and/or at least one urea group, and weight percentage of the copolymer is 0.1-85 wt. % based on total weight of the mixture;

(2) heating the mixture at a temperature between 50 and 220° C. to obtain a product containing inorganic substances and organic substances;

(3) separating the inorganic substances and the organic substances from the product by extraction, crystallization, distillation, filtration or their combinations, wherein the organic substances comprise higher molecular weight molecules and lower molecular weight molecules; and (4) separating the higher molecular weight molecules and lower molecular weight molecules from the organic substances by extraction, crystallization, distillation, filtration or their combinations.

10. The process for recycling waste thermoset material of claim 9, wherein the copolymer has a number-average molecular weight ($M_n$) between 100 and 50,000 Da.

11. The process for recycling waste thermoset material of claim 9, wherein the waste thermoset material comprises PU thermoset resin, PU foam, epoxy thermoset resin, phenol-formaldehyde thermoset resin, reinforced composite, benzoxazine thermoset resin, acrylate thermoset resin or their combination.

12. The process for recycling waste thermoset material of claim 9, wherein the carbamate group has a structure as shown in formula (1);

(1)

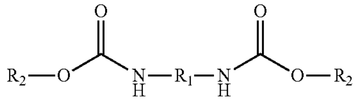

where $R_1$ is C2-C20 linear or branch alkyl group, C3-C8 cyclic alkyl group, polyether group having a molecular weight of 50-10,000 Da, or polysiloxane group having a molecular weight of 50-10,000 Da;

$R_2$ is C2-C20 linear or branch alkyl group, C3-C8 cyclic alkyl group, phenyl group, C7-C20 alkyl phenyl group or C6-C20 alkyl phenolic group.

13. The process for recycling waste thermoset material of claim 9, wherein the carbonate group has a structure as shown in formula (3), (3)

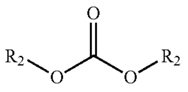

where $R_2$ is C2-C20 linear or branch alkyl group, C3-C8 cyclic alkyl group, phenyl group, C7-C20 alkyl phenyl group or C6-C20 alkyl phenolic group.

* * * * *